United States Patent
Tsai et al.

(10) Patent No.: US 8,730,590 B1
(45) Date of Patent: May 20, 2014

(54) IMAGE CAPTURING LENS SYSTEM

(71) Applicant: Largan Precision Co., Ltd., Taichung (TW)

(72) Inventors: Tsung-Han Tsai, Taichung (TW); Chun-Che Hsueh, Taichung (TW); Wei-Yu Chen, Taichung (TW)

(73) Assignee: Largan Precision Co., Ltd., Taichung (TW)

( * ) Notice: Subject to any disclaimer, the term of this patent is extended or adjusted under 35 U.S.C. 154(b) by 8 days.

(21) Appl. No.: 13/743,127

(22) Filed: Jan. 16, 2013

(30) Foreign Application Priority Data

Nov. 29, 2012 (TW) .............................. 101144803 A

(51) Int. Cl.
*G02B 9/34* (2006.01)
*G02B 13/08* (2006.01)
*G02B 13/00* (2006.01)

(52) U.S. Cl.
CPC ................ *G02B 13/004* (2013.01); *G02B 9/34* (2013.01)
USPC ............................ 359/715; 359/722; 359/771

(58) Field of Classification Search
CPC ...... G02B 3/04; G02B 13/002; G02B 13/004; G02B 9/34
USPC .......................................... 359/715, 771, 772
See application file for complete search history.

(56) References Cited

U.S. PATENT DOCUMENTS

| | | | |
|---|---|---|---|
| 6,950,246 B2 * | 9/2005 | Amanai | ......................... 359/771 |
| 7,564,635 B1 | 7/2009 | Tang | |
| 8,358,475 B2 * | 1/2013 | Tsai et al. | ..................... 359/772 |
| 2012/0099009 A1 | 4/2012 | Hsu et al. | |

* cited by examiner

*Primary Examiner* — David N Spector
(74) *Attorney, Agent, or Firm* — Morris Manning & Martin, LLP; Tim Tingkang Xia, Esq.

(57) ABSTRACT

This disclosure provides an image capturing lens system, in order from an object side to an image side comprising: a first lens element with positive refractive power having a convex object-side surface and a concave image-side surface; a second lens element with positive refractive power; a third lens element with positive refractive power; and a fourth lens element with positive refractive power having a convex object-side surface, a concave at a paraxial region and convex at a peripheral region image-side surface, and both of the object-side and image-side surfaces thereof being aspheric; wherein the lens elements of the image capturing lens system with refractive power are the first lens element, the second lens element, the third lens element and the fourth lens element.

22 Claims, 22 Drawing Sheets

IMAGE CAPTURING LENS SYSTEM

CROSS-REFERENCE TO RELATED APPLICATION

This non-provisional application claims priority under 35 U.S.C. §119(a) on Patent Application No. 101144803 filed in Taiwan (R.O.C.) on Nov. 29, 2012, the entire contents of which are hereby incorporated by reference.

TECHNICAL FIELD

The present disclosure relates to an image capturing lens system, and more particularly, to an image capturing lens system used in infrared as well as visible light wavelength ranges.

BACKGROUND

The demand for compact imaging lens assembly grows in recent years with the increasing popularity of portable electronic products with photographing function. The sensor of a general photographing camera is none other than CCD (Charge Coupled Device) or CMOS (Complementary Metal Oxide Semiconductor) sensor. As the advanced semiconductor manufacturing technology has allowed the pixel size of the sensors to be reduced, the compact imaging lens assemblies are gradually adopted in high pixel count cameras, which brings a stringent requirement on the image quality of the compact lens assemblies as well as requirement on precision manufacturing. These requirements usually lower the yield rate and result a higher cost; therefore, a lens system structure which is less sensitive to variations of the manufacturing process is needed.

The traditional compact imaging lens system equipped on a portable electronic device usually comprises three lenses; for example, U.S. Pat. No. 7,564,635 discloses a lens system comprising three lenses with positive refractive power; however, the conventional three-lens configuration can't meet the image quality requirement today. US Publication No. 2012/0099009 discloses a lens system having a four-lens configuration, though the image quality of this lens system is improved, however, the positive refractive powers in this design are not distributed in a balanced manner, and this lens system includes a lens element with negative refractive power, which leads to the result that the total track length of this lens system can't be reduced effectively and limits its application in compact electronic devices.

On the other hand, because of its advantages of being not interfered by visible light and being not perceived by naked eyes, infrared has been integrated with electronic technologies to develop various electronic products, such as remote control devices, infrared monitors and infrared detector systems. The emerging motion capture technology applied in smart TV or motion sensing games which captures and recognizes the user's motion by an infrared camera expands the application of compact imaging lens in infrared wavelength range. In view of this, the industry needs a lens system structure which has higher tolerance on variations of the manufacturing process and therefore a higher yield rate; furthermore, the lens system structure can suffice the needs of ordinary photography and infrared applications.

SUMMARY

The present disclosure provides an image capturing lens system, in order from an object side to an image side comprising: a first lens element with positive refractive power having a convex object-side surface and a concave image-side surface; a second lens element with positive refractive power; a third lens element with positive refractive power; and a fourth lens element with positive refractive power having a convex object-side surface, a concave at a paraxial region and convex at a peripheral region image-side surface, and both of the object-side and image-side surfaces thereof being aspheric; wherein the lens elements of the image capturing lens system with refractive power are the first lens element, the second lens element, the third lens element and the fourth lens element, an axial distance between the object-side surface of the first lens element and an image plane is TL, a sum of central thicknesses of the first, the second, the third and the fourth lens elements is ΣCT, a focal length of the image capturing lens system is f, a curvature radius of the object-side surface of the second lens element is R3, and they satisfy the following relations: $1.35 < TL/\Sigma CT < 1.95$; and $0 < f/|R3| < 1.0$.

In another aspect, the present disclosure provides an image capturing lens system, in order from an object side to an image side comprising: a first lens element with positive refractive power having a convex object-side surface and a concave image-side surface; a second lens element with positive refractive power having a convex image-side surface; a third lens element with positive refractive power; and a fourth lens element with positive refractive power having a convex object-side surface, a concave at a paraxial region and convex at a peripheral region image-side surface, and both of the object-side and image-side surfaces thereof being aspheric; wherein the lens elements of the image capturing lens system with refractive power are the first lens element, the second lens element, the third lens element and the fourth lens element, an axial distance between the object-side surface of the first lens element and an image plane is TL, a sum of central thicknesses of the first, the second, the third and the fourth lens elements is ΣCT, a curvature radius of the object-side surface of the second lens element is R3, a curvature radius of the image-side surface of the second lens element is R4, and they satisfy the following relations: $1.35 < TL/\Sigma CT < 2.50$; and $-0.92 < R4/|R3| < 0$.

DETAILED DESCRIPTION OF THE DISCLOSURE

Figure 1A:
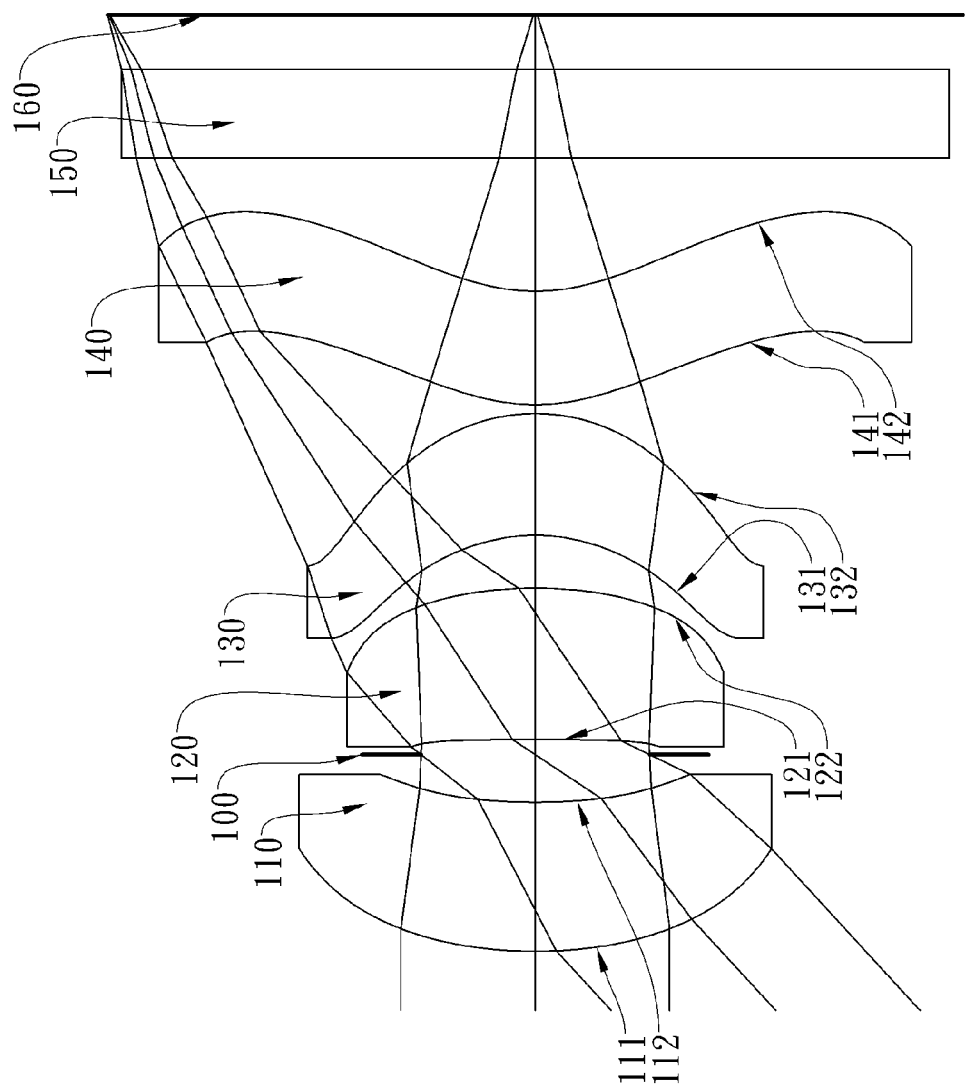
FIG. 1A shows an image capturing lens system in accordance with the first embodiment of the present disclosure.

The present disclosure provides an image capturing lens system, in order from an object side to an image side comprising a first lens element, a second lens element, a third lens element, and a fourth lens element; all these lens elements have refractive power.

The first lens element has positive refractive power; the object-side surface is convex, and the image-side surface is concave. This configuration provides the refractive power needed while reducing the total track length of the lens system and the aberrations at the same time.

The second lens element has positive refractive power, and the image-side surface of the second lens element can be convex. This configuration balances the positive refractive powers in order to reduce the sensitivity.

The third lens element has positive refractive power; the object-side surface can be concave, and the image-side surface can be convex. This configuration balances the distribution of the positive refractive powers and corrects the aberrations.

The fourth lens element has positive refractive power; the object-side surface is convex, and the image-side surface is concave at a paraxial region and convex at a peripheral region. This configuration helps to correct the astigmatism of the system, lower the sensitivity, and reduce the incident angle at which rays from off-axis field enter the sensor, which enhances the receiving efficiency of the sensor and further corrects the off-axis aberrations.

The aforementioned first, second, third and fourth lens elements all have positive refractive power; by this configuration, the refractive power needed can be distributed on each lens element evenly, and the sensitivities of the lens system with respect to the variations of the manufacturing process, such as variation of curvature radius or central thickness of the lens element, are reduced.

An axial distance between the object-side surface of the first lens element and an image plane is TL, and a sum of central thicknesses of the first, the second, the third and the fourth lens elements is ECT; when the following relation: $1.35<TL/\Sigma CT<2.50$ is satisfied, the thicknesses of the lens elements are not too thin or too thick, which helps to enhance the image quality, and keeps the compactness of the lens system such that the lens can be equipped on a portable electronic device; preferably, the following relation: $1.35<TL/\Sigma CT<1.95$ is satisfied.

A focal length of the image capturing lens system is f, and a curvature radius of the object-side surface of the second lens element is R3; when the following relation: $0<f/|R3|<1.0$ is satisfied, the aberration of the system is reduced; preferably, the following relation: $0<f/|R3|<0.6$ is satisfied.

A curvature radius of the image-side surface of the second lens element is R4, and the curvature radius of the object-side surface of the second lens element is R3; when the following relation: $-0.92<R4/|R3|<0$ is satisfied, the astigmatism can be well-corrected, and the spherical aberration can be reduced; preferably, the following relation: $-0.65<R4/|R3|<0$ is satisfied.

A f-number of the image capturing lens system is Fno; when the following relation: $1.4<Fno<2.8$ is satisfied, the image capturing lens system has the advantage of a large aperture, i.e. in a dim environment, the user can still choose a fast shutter speed to capture a clear image.

The focal length of the image capturing lens system is f, a focal length of the first lens element is f1, a focal length of the second lens element is f2, a focal length of the third lens element is f3, and a focal length of the fourth lens element is f4; when the following relation: $0.70<|f/f1|+|f/f2|+|f/f3|+|f/f4|<1.5$ is satisfied, the refractive power can be distributed on each lens element evenly to reduce the sensitivities of the lens system with respect to the variations of the manufacturing process, such as variation of curvature radius or central thickness of the lens element; therefore, the yield rate can be enhanced.

The image capturing lens system further comprises a stop disposed between the first and the second lens elements, an axial distance between the stop and the image plane is SL, and the axial distance between the object-side surface of the first lens element and the image plane is TL; when the following relation: $0.65<SL/TL<0.85$ is satisfied, the image capturing lens system has a good balance between the telecentricity and wide field of view.

An distance in parallel with the optical axis from an axial vertex on the image-side surface of the third lens element to a maximal effective diameter position on the image-side surface of the third lens element is SAG32 (If the axial vertex is on the object-side of the maximal effective diameter position, SAG32 is defined to be positive; if the axial vertex is on the image-side of the maximal effective diameter position, SAG32 is defined to be negative.), and the central thickness of the third lens element is CT3; when the following relation: $1.0<|SAG32|/CT3<2.0$ is satisfied, the surface curvature of the third lens element is proper, and the thickness of the third lens element is appropriate, which improves the manufacture and the assembly of the lens elements.

The image capturing lens system can be used for infrared wavelengths ranging from 780 nm to 950 nm for applications in motion capture technology.

The focal length of the image capturing lens system is f, and the focal length of the first lens element is f1; when the following relation: $0.1<f/f1<1.0$ is satisfied, the allocated refractive power of the first lens element is appropriate, which keeps the compactness of the lens system.

An axial distance between the first and the second lens elements is T12, an axial distance between the second and the third lens elements is T23, and an axial distance between the third and the fourth lens elements is T34; when the following relation: $0.90<T12/(T23+T34)<3.0$ is satisfied, the distances between each lens element are appropriate, which enhances the yield rate of the lens assembling.

The focal length of the image capturing lens system is f, the focal length of the first lens element is f1, the focal length of the second lens element is f2, the focal length of the third lens element is f3, and the focal length of the fourth lens element is f4; when the following relations: |f/fi|<0.70, i=1, 2, 3, 4 are satisfied, the refractive power can be distributed on each lens element evenly to reduce the aberrations incurred and enhance the image quality.

In the image capturing lens system of the present disclosure, the lens elements can be made of glass or plastic materials. If the lens elements are made of glass, the freedom for distributing the refractive power of the image capturing lens system can be increased. If a plastic material is adopted to produce the lens elements, the production cost will be reduced effectively; additionally, the surfaces of the lens elements can be aspheric and easily made into non-spherical profiles, allowing more design parameters which can be used to reduce aberrations and the number of the lens elements required in an optical system. Consequently, the total track length of the image capturing lens system can be effectively reduced.

In the image capturing lens system of the present disclosure, there can be at least one stop provided, such as an aperture stop, a glare stop or a field stop. Said glare stop or said field stop is for eliminating the stray light and thereby improving the image resolution thereof.

In the image capturing lens system of the present disclosure, an aperture stop can be configured as a front stop or a middle stop. A front stop can provide a longer distance between an exit pupil of the system and an image plane and which improves the image-sensing efficiency of an image sensor. A middle stop is favorable for enlarging the field of view of the system and thereby provides a wider field of view for the same.

In the image capturing lens system of the present disclosure, if a lens element is described to have a convex surface, it means the portion of the surface in proximity to the optical axis, or the paraxial region of the surface is convex; if a lens element is described to have a concave surface, it means the portion of the surface in proximity to the optical axis is concave.

The image capturing lens system of the present disclosure will be detailed by the following embodiments accompanied by the drawings.

Embodiment 1

Figure 1B:
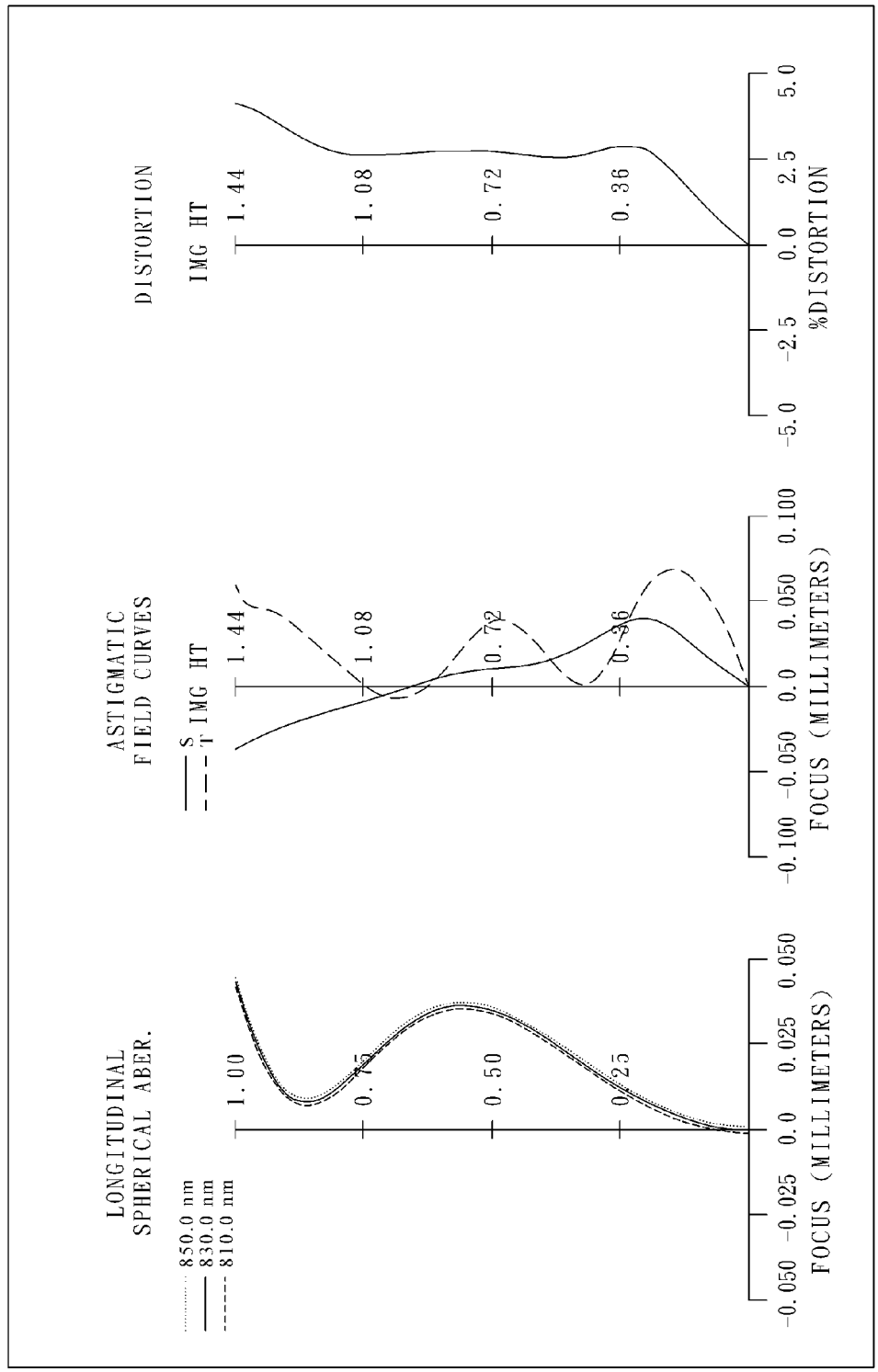
FIG. 1B shows the aberration curves of the first embodiment of the present disclosure.

FIG. 1A shows an image capturing lens system in accordance with the first embodiment of the present disclosure, FIG. 1B shows the aberration curves of the first embodiment of the present disclosure. The image capturing lens system of the first embodiment of the present disclosure mainly comprises four lens elements, in order from an object side to an image side:

a plastic first lens element 110 with positive refractive power having a convex object-side surface 111 at the paraxial region, a concave image-side surface 112 at the paraxial region, and both of the object-side surface 111 and image-side surface 112 thereof being aspheric;

a plastic second lens element 120 with positive refractive power having a concave object-side surface 121 at the paraxial region, a convex image-side surface 122 at the paraxial region, and both of the object-side surface 121 and image-side surface 122 thereof being aspheric;

a plastic third lens element 130 with positive refractive power having a concave object-side surface 131 at the paraxial region, a convex image-side surface 132 at the paraxial region, and both of the object-side surface 131 and image-side surface 132 thereof being aspheric; and a plastic fourth lens element 140 with positive refractive power having a convex object-side surface 141 at the paraxial region, a concave at the paraxial region and convex at the peripheral region image-side surface 142 at the paraxial region, and both of the object-side surface 141 and image-side surface 142 thereof being aspheric;

wherein the image capturing lens system further comprises a stop 100 disposed between the first lens element 110 and the second lens element 120, the image capturing lens system further comprises a filter element 150 disposed between the fourth lens element 140 and the image plane 160, and the filter element 150 is made of glass and has no influence on the focal length of the image capturing lens system.

The detailed optical data of the first embodiment is shown in TABLE 1, the aspheric surface data is shown in TABLE 2, wherein the units of the curvature radius, the thickness and the focal length are mm, and HFOV is half of the maximal field of view.

TABLE 1

(Embodiment 1)
f = 1.50 mm, Fno = 1.65, HFOV = 42.5 deg,

| Surface # | | Curvature Radius | | Thickness | Material | | Index | Focal Length |
|---|---|---|---|---|---|---|---|---|
| 0 | Object | Plano | | Infinity | | | | |
| 1 | Lens 1 | 1.530 | ASP | 0.504 | Plastic | APEL-5514ML | 1.537 | 8.41 |
| 2 | | 2.048 | ASP | 0.161 | | | | |
| 3 | Ape. Stop. | Plano | | 0.051 | | | | |
| 4 | Lens 2 | −17.732 | ASP | 0.512 | Plastic | APEL-5514ML | 1.537 | 2.88 |
| 5 | | −1.435 | ASP | 0.179 | | | | |
| 6 | Lens 3 | −0.591 | ASP | 0.411 | Plastic | APEL-5514ML | 1.537 | 6.53 |
| 7 | | −0.628 | ASP | 0.030 | | | | |
| 8 | Lens 4 | 0.636 | ASP | 0.384 | Plastic | ZEONEX F52R | 1.527 | 5.33 |
| 9 | | 0.651 | ASP | 0.450 | | | | |
| 10 | Filter | Plano | | 0.300 | Glass | HOYA BSC7 | 1.510 | — |
| 11 | | Plano | | 0.184 | | | | |
| 12 | Image | Plano | | — | | | | |

* The reference wavelength for the focal length and refractive index calculations is 830 nm.

TABLE 2

Aspheric Coefficients

| Surface # | 1 | 2 | 4 | 5 |
|---|---|---|---|---|
| k = | −1.6674E+00 | −3.9480E+01 | 1.0000E+01 | 2.1667E+00 |
| A4 = | 2.3974E−01 | 9.3996E−01 | −1.8239E−01 | −1.1276E−01 |
| A6 = | −5.3629E−02 | −9.9996E−01 | −3.2549E+00 | −7.2176E−01 |
| A8 = | 3.7702E−01 | 5.6491E−01 | 3.4439E+01 | 2.2253E+00 |
| A10 = | 2.1555E−02 | −3.2878E+00 | −1.7347E+02 | −5.4450E+00 |
| A12 = |  | −5.6546E−01 | 9.1096E−09 | −9.8838E+00 |
| A14 = |  | −2.7286E−08 |  | 7.1686E−09 |

| Surface # | 6 | 7 | 8 | 9 |
|---|---|---|---|---|
| k = | −8.7460E+00 | −4.7129E−01 | −7.1013E+00 | −3.4830E+00 |
| A4 = | −2.7784E+00 | −1.6105E−01 | 6.4124E−01 | −3.3218E−02 |
| A6 = | 1.1358E+01 | −2.9268E+00 | −3.3477E+00 | −7.8089E−01 |
| A8 = | −4.6915E+01 | 2.7038E+01 | 8.1006E+00 | 1.9548E+00 |
| A10 = | 1.0615E+02 | −9.7634E+01 | −1.1641E+01 | −2.5335E+00 |
| A12 = | −8.2170E+01 | 1.5974E+02 | 9.7582E+00 | 1.8055E+00 |
| A14 = | 1.7194E+00 | −9.0349E+01 | −4.3966E+00 | −6.6973E−01 |
| A16 = |  |  | 8.1711E−01 | 1.0018E−01 |

The equation of the aspheric surface profiles is expressed as follows:

$$X(Y) = (Y^2/R) / \left(1 + sqrt(1 - (1+k)*(Y/R)^2)\right) + \sum_i (Ai)*(Y^i)$$

wherein:

X: the relative distance between a point on the aspheric surface at a distance Y from the optical axis and the tangential plane at the aspheric surface vertex;

Y: the distance from the point on the curve of the aspheric surface to the optical axis;

R: the curvature radius;

k: the conic coefficient;

Ai: the aspheric coefficient of order i.

In the first embodiment of the present image capturing lens system, the focal length of the image capturing lens system is f, the f-number of the image capturing lens system is Fno, half of the maximal field of view of the image capturing lens system is HFOV, and they satisfy the following relations: f=1.50 (mm); Fno=1.65; HFOV=42.5 (deg).

In the first embodiment of the present image capturing lens system, the object-side surface 111 of the first lens element 110 and the image plane 160 is TL, the sum of central thicknesses of the first, the second, the third and the fourth elements is ΣCT, and they satisfy the following relation: TL/ΣCT=1.75.

In the first embodiment of the present image capturing lens system, the focal length of the image capturing lens system is f, the focal length of the first lens element 110 is f1, and they satisfy the following relation: f/f1=0.18.

In the first embodiment of the present image capturing lens system, the focal length of the image capturing lens system is f, the curvature radius of the object-side surface 121 of the second lens element 120 is R3, and they satisfy the following relation: f/|R3|=0.08.

In the first embodiment of the present image capturing lens system, the focal length of the image capturing lens system is f, the focal length of the first lens element 110 is f1, the focal length of the second lens element 120 is f2, the focal length of the third lens element 130 is f3, the focal length of the fourth lens element 140 is f4, and they satisfy the following relation: |f/f1|+|f/f2|+|f/f3|+|f/f4|=1.21.

In the first embodiment of the present image capturing lens system, the axial distance between the first lens element 110 and the second lens element 120 is T12, the axial distance between the second lens element 120 and the third lens element 130 is T23, the axial distance between the third lens element 130 and the fourth lens element 140 is T34, and they satisfy the following relation: T12/(T23+T34)=1.01.

In the first embodiment of the present image capturing lens system, the axial distance between the stop 100 and the image plane 160 is SL, the axial distance between the object-side surface 111 of the first lens element 110 and the image plane 160 is TL, and they satisfy the following relation: SL/TL=0.79.

In the first embodiment of the present image capturing lens system, the curvature radius of the image-side surface 122 of the second lens element 120 is R4, the curvature radius of the object-side surface 121 of the second lens element 120 is R3, and they satisfy the following relation: R4/|R3|=−0.08.

In the first embodiment of the present image capturing lens system, the distance in parallel with the optical axis from an axial vertex on the image-side surface 132 of the third lens element 130 to a maximal effective diameter position on the image-side surface 132 of the third lens element 130 is SAG32, the central thickness of the third lens element 130 is CT3, and they satisfy the following relation: |SAG32|/CT3=1.25.

Embodiment 2

Figure 2A:
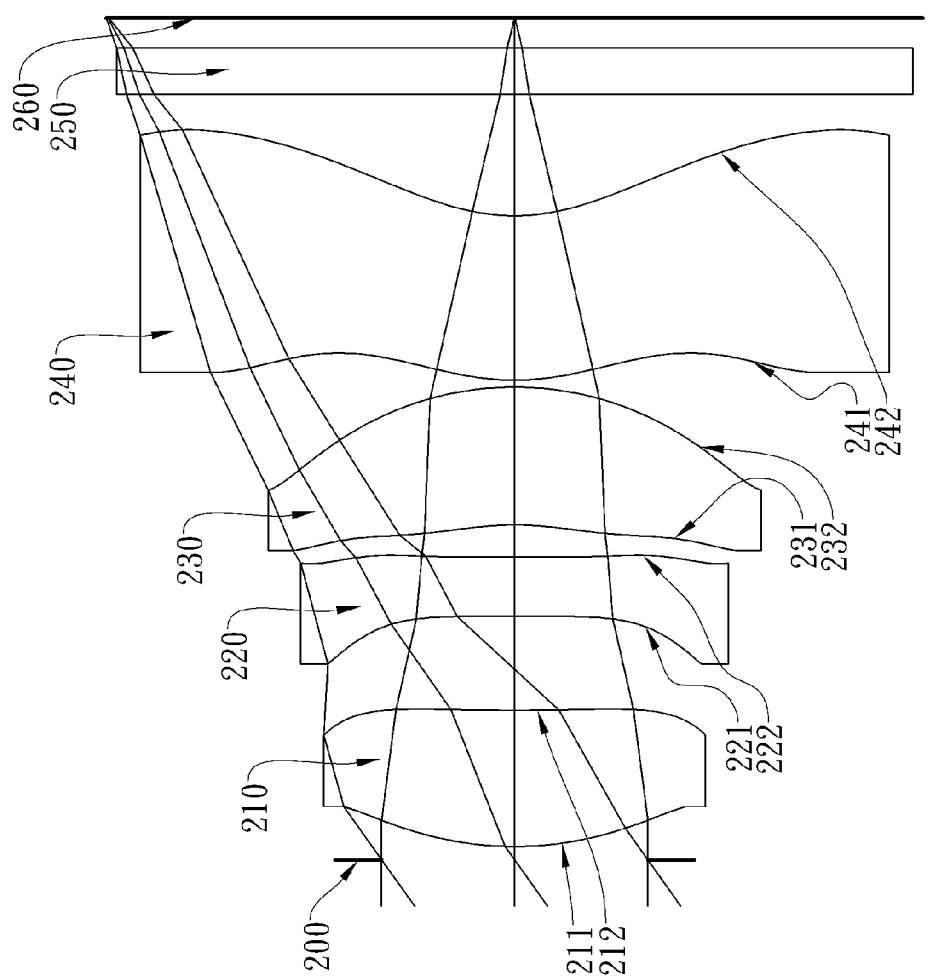
FIG. 2A shows an image capturing lens system in accordance with the second embodiment of the present disclosure.
Figure 2B:
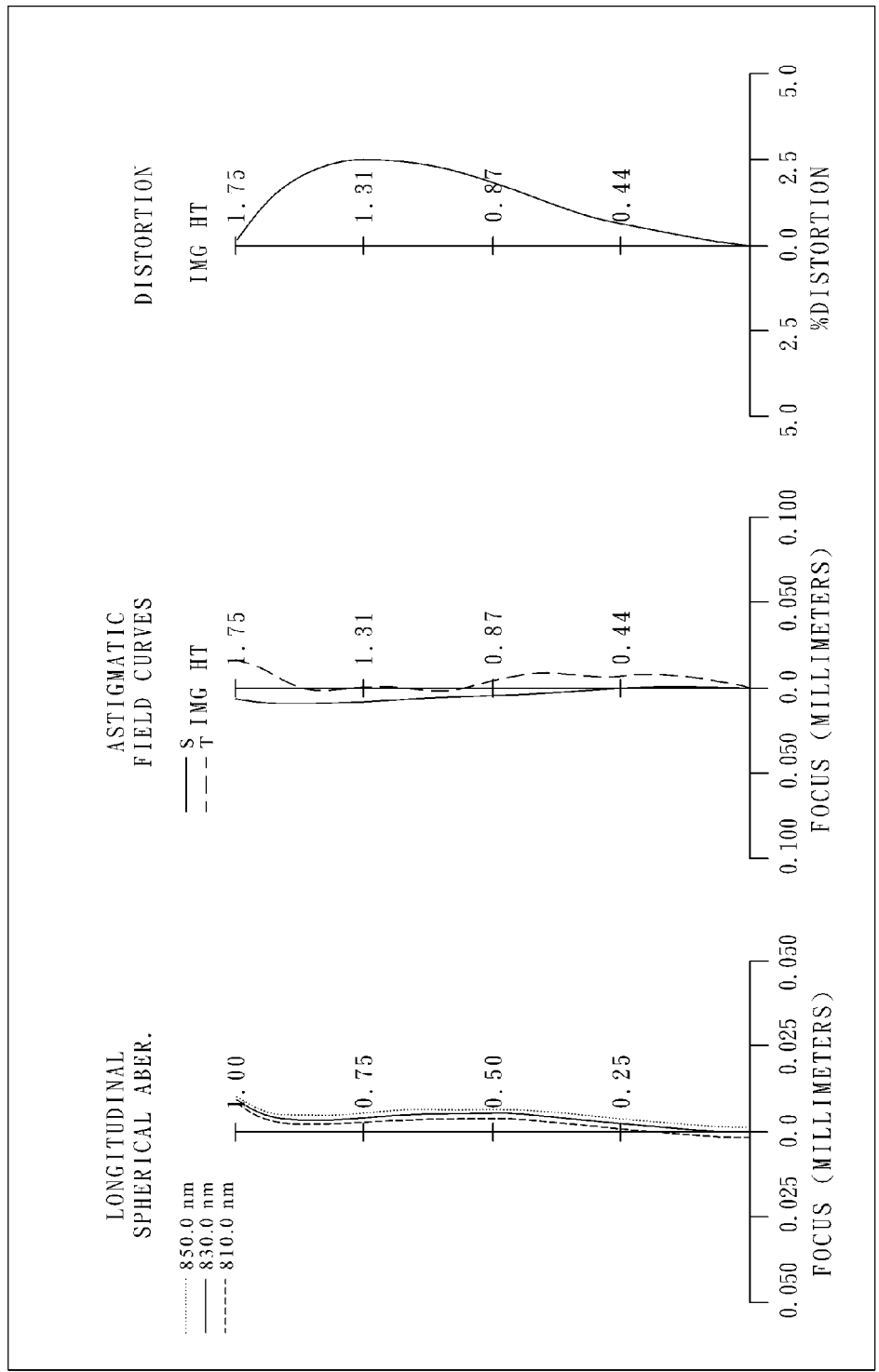
FIG. 2B shows the aberration curves of the second embodiment of the present disclosure.

FIG. 2A shows an image capturing lens system in accordance with the second embodiment of the present disclosure, FIG. 2B shows the aberration curves of the second embodiment of the present disclosure. The image capturing lens system of the second embodiment of the present disclosure mainly comprises four lens elements, in order from an object side to an image side:

a plastic first lens element 210 with positive refractive power having a convex object-side surface 211 at the paraxial region, a concave image-side surface 212 at the paraxial region, and both of the object-side surface 211 and image-side surface 212 thereof being aspheric;

a plastic second lens element 220 with positive refractive power having a convex object-side surface 221 at the paraxial region, a convex image-side surface 222 at the paraxial region, and both of the object-side surface 221 and image-side surface 222 thereof being aspheric;

a plastic third lens element 230 with positive refractive power having a concave object-side surface 231 at the paraxial region, a convex image-side surface 232 at the paraxial region, and both of the object-side surface 231 and image-side surface 232 thereof being aspheric; and a plastic fourth lens element 240 with positive refractive power having a convex object-side surface 241 at the paraxial region, a concave at the paraxial region and convex at the peripheral region image-side surface 242 at the paraxial region, and both of the object-side surface 241 and image-side surface 242 thereof being aspheric;

wherein the image capturing lens system further comprises a stop 200 disposed between the object and the first lens element 210, the image capturing lens system further comprises a filter element 250 disposed between the fourth lens element 240 and the image plane 260, and the filter element 250 is made of glass and has no influence on the focal length of the image capturing lens system.

The detailed optical data of the second embodiment is shown in TABLE 3, the aspheric surface data is shown in TABLE 4, wherein the units of the curvature radius, the thickness and the focal length are mm, and HFOV is half of the maximal field of view.

TABLE 3

(Embodiment 2)
f = 2.46 mm, Fno = 2.15, HFOV = 35.3 deg,

| Surface # | | Curvature Radius | | Thickness | Material | | Index | Focal Length |
|---|---|---|---|---|---|---|---|---|
| 0 | Object | Plano | | Infinity | | | | |
| 1 | Ape. Stop. | Plano | | 0.057 | | | | |
| 2 | Lens 1 | 1.430 | ASP | 0.586 | Plastic | ZEONEX K26R | 1.528 | 3.17 |
| 3 | | 8.445 | ASP | 0.405 | | | | |
| 4 | Lens 2 | 75.274 | ASP | 0.255 | Plastic | MGC EP5000 | 1.616 | 22.79 |
| 5 | | −17.225 | ASP | 0.139 | | | | |
| 6 | Lens 3 | −1.198 | ASP | 0.593 | Plastic | ZEONEX K26R | 1.528 | 88.51 |
| 7 | | −1.367 | ASP | 0.030 | | | | |
| 8 | Lens 4 | 1.038 | ASP | 0.708 | Plastic | ZEONEX K26R | 1.528 | 32.96 |
| 9 | | 0.844 | ASP | 0.522 | | | | |
| 10 | Filter | Plano | | 0.200 | Glass | HOYA BSC7 | 1.510 | — |
| 11 | | Plano | | 0.129 | | | | |
| 12 | Image | Plano | | | | | | |

* The reference wavelength for the Focal length and refractive index calculations is 830 nm.

TABLE 4

Aspheric Coefficients

| Surface # | 2 | 3 | 4 | 5 |
|---|---|---|---|---|
| k = | −2.6106E+00 | 7.2421E+01 | 3.0000E+01 | −3.0000E+01 |
| A4 = | 7.5570E−02 | −1.3713E−01 | −2.4858E−01 | 6.2278E−01 |
| A6 = | −2.7102E−02 | −2.0497E−01 | −7.3171E−01 | −1.9437E+00 |
| A8 = | −2.7748E−01 | 4.0615E−02 | −9.4164E−01 | 1.5206E+00 |
| A10 = | 7.4660E−01 | −1.2178E−01 | 4.8044E+00 | 2.5976E−01 |
| A12 = | −1.0760E+00 | −4.5766E−01 | −4.6420E+00 | −4.8427E−01 |
| A14 = | −3.4791E−01 | 1.9063E−01 | −3.1559E−01 | 1.1586E−02 |
| A16 = | 3.0305E−01 | 1.6364E−01 | 2.2136E+00 | 4.3158E−02 |

| Surface # | 6 | 7 | 8 | 9 |
|---|---|---|---|---|
| k = | −1.5891E+01 | −2.9351E−01 | −6.8987E+00 | −2.4200E+00 |
| A4 = | 6.6510E−01 | −7.6557E−03 | −6.6669E−02 | −1.7675E−01 |
| A6 = | −7.9669E−01 | −1.2431E−01 | −5.3007E−01 | 2.6299E−02 |
| A8 = | −1.0213E+00 | 2.5887E−01 | 7.6922E−01 | 6.5300E−02 |
| A10 = | 2.4290E+00 | −1.8572E−01 | −5.3925E−01 | −6.2332E−02 |
| A12 = | −1.3697E+00 | 1.7789E−02 | 2.3275E−01 | 2.6272E−02 |
| A14 = | −1.2558E−02 | 5.7667E−03 | −5.7972E−02 | −5.7117E−03 |
| A16 = | 1.8568E−01 | 3.1650E−02 | 6.2233E−03 | 5.2166E−04 |

The equation of the aspheric surface profiles of the second embodiment has the same form as that of the first embodiment. Moreover, the description of the factors in the relations is as those set forth in the first embodiment, but the values of the relations of the second embodiment are listed in the following TABLE 5.

TABLE 5

| Embodiment 2 | | | |
|---|---|---|---|
| f [mm] | 2.46 | $|f/f1| + |f/f2| + |f/f3| + |f/f4|$ | 0.99 |
| Fno | 2.15 | T12/(T23 + T34) | 2.40 |
| HFOV [deg.] | 35.3 | SL/TL | 1.02 |
| TL/ΣCT | 1.67 | R4/|R3| | −0.23 |
| f/f1 | 0.78 | |SAG32|/CT3 | 0.75 |
| f/|R3| | 0.03 | | |

Embodiment 3

Figure 3A:
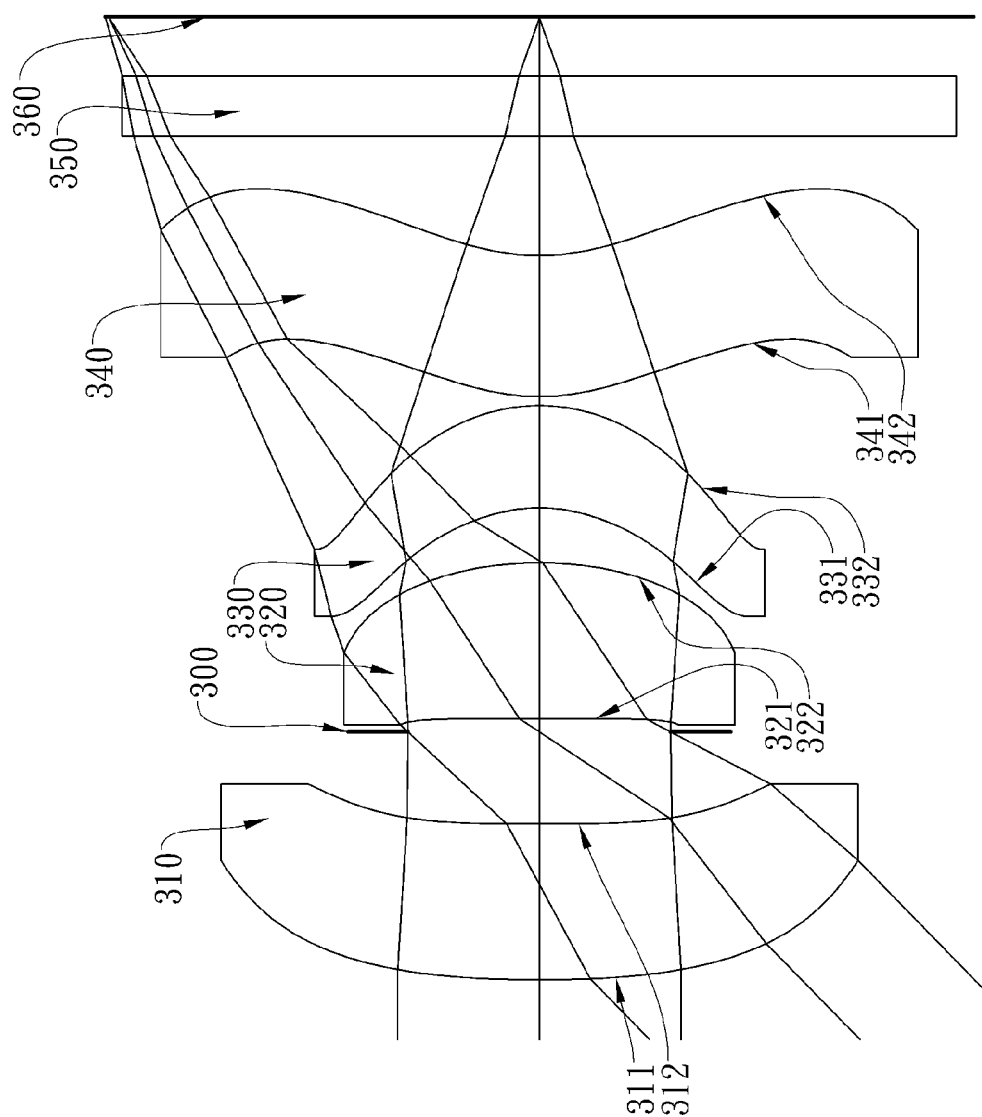
FIG. 3A shows an image capturing lens system in accordance with the third embodiment of the present disclosure.
Figure 3B:
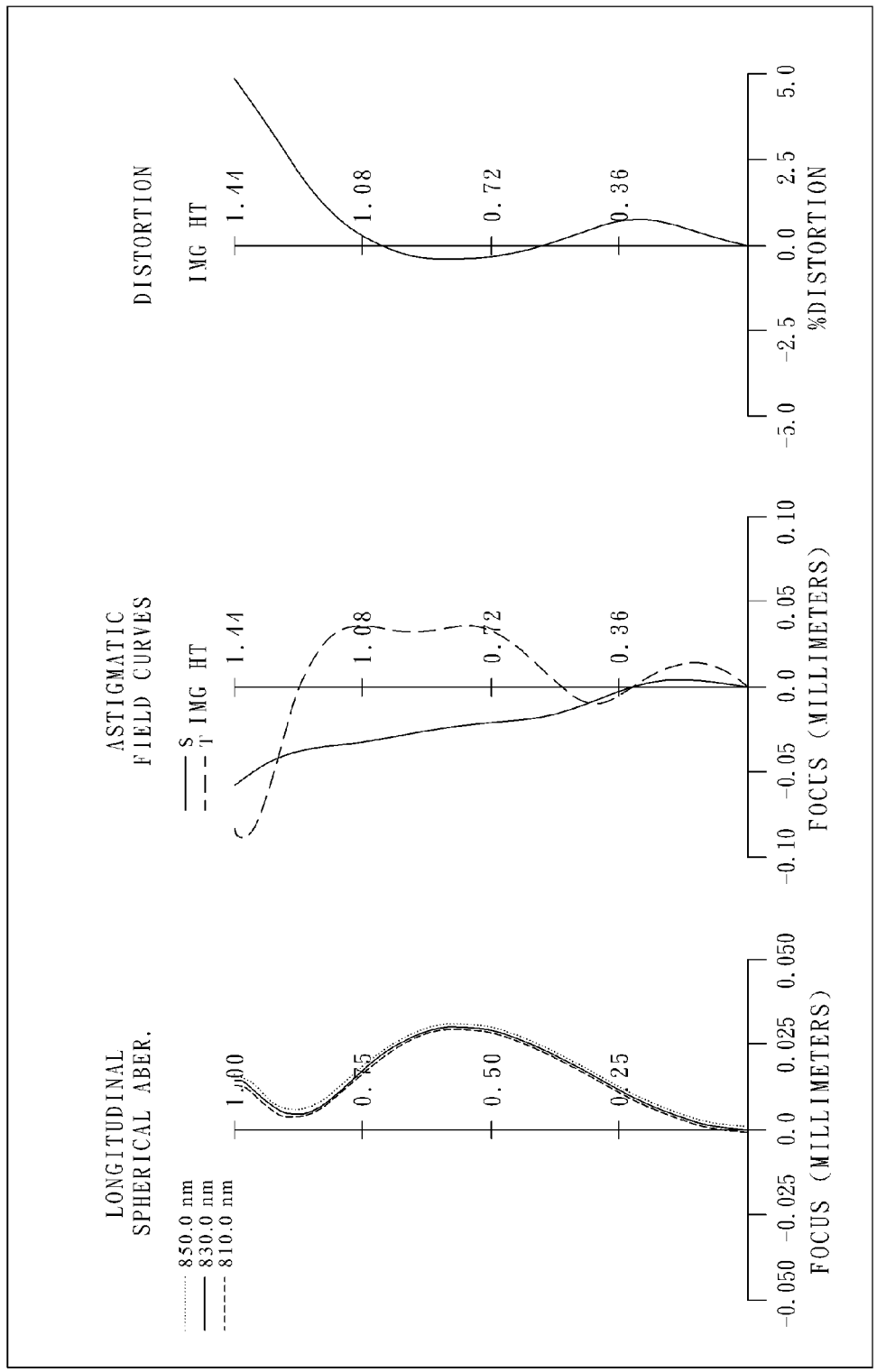
FIG. 3B shows the aberration curves of the third embodiment of the present disclosure.

FIG. 3A shows an image capturing lens system in accordance with the third embodiment of the present disclosure, FIG. 3B shows the aberration curves of the third embodiment of the present disclosure. The image capturing lens system of the third embodiment of the present disclosure mainly comprises four lens elements, in order from an object side to an image side:

a plastic first lens element 310 with positive refractive power having a convex object-side surface 311 at the paraxial region, a concave image-side surface 312 at the paraxial region, and both of the object-side surface 311 and image-side surface 312 thereof being aspheric;

a plastic second lens element 320 with positive refractive power having a convex object-side surface 321 at the paraxial region, a convex image-side surface 322 at the paraxial region, and both of the object-side surface 321 and image-side surface 322 thereof being aspheric;

a plastic third lens element 330 with positive refractive power having a concave object-side surface 331 at the paraxial region, a convex image-side surface 332 at the paraxial region, and both of the object-side surface 331 and image-side surface 332 thereof being aspheric; and a plastic fourth lens element 340 with positive refractive power having a convex object-side surface 341 at the paraxial region, a concave at the paraxial region and convex at the peripheral region image-side surface 342 at the paraxial region, and both of the object-side surface 341 and image-side surface 342 thereof being aspheric;

wherein the image capturing lens system further comprises a stop 300 disposed between the first lens element 310 and the second lens element 320, the image capturing lens system further comprises a filter element 350 disposed between the fourth lens element 340 and the image plane 360, and the filter element 350 is made of glass and has no influence on the focal length of the image capturing lens system.

The detailed optical data of the third embodiment is shown in TABLE 6, the aspheric surface data is shown in TABLE 7, wherein the units of the curvature radius, the thickness and the focal length are mm, and HFOV is half of the maximal field of view.

TABLE 6

(Embodiment 3)
f = 1.40 mm, Fno = 1.48, HFOV = 44.2 deg.

| Surface # | | Curvature Radius | | Thickness | Material | Index | Focal Length |
|---|---|---|---|---|---|---|---|
| 0 | Object | Plano | | Infinity | | | |
| 1 | Lens 1 | 4.167 | ASP | 0.521 | Plastic ZEONEX F52R | 1.527 | 9.87 |
| 2 | | 19.991 | ASP | 0.308 | | | |
| 3 | Ape. Stop. | Plano | | 0.044 | | | |
| 4 | Lens 2 | 22.055 | ASP | 0.522 | Plastic ZEONEX F52R | 1.527 | 2.21 |
| 5 | | −1.219 | ASP | 0.184 | | | |
| 6 | Lens 3 | −0.510 | ASP | 0.342 | Plastic ZEONEX F52R | 1.527 | 27.74 |
| 7 | | −0.607 | ASP | 0.030 | | | |
| 8 | Lens 4 | 0.688 | ASP | 0.472 | Plastic ZEONEX F52R | 1.527 | 4.59 |
| 9 | | 0.733 | ASP | 0.400 | | | |
| 10 | Filter | Plano | | 0.200 | Glass HOYA BSC7 | 1.510 | — |
| 11 | | Plano | | 0.198 | | | |
| 12 | Image | Plano | | — | | | |

* The reference wavelength for the Focal length and refractive index calculations is 830 nm.

TABLE 7

| Aspheric Coefficients | | | | |
|---|---|---|---|---|
| Surface # | 1 | 2 | 4 | 5 |
| k = | −5.0000E+01 | 3.0000E+00 | −1.0000E+00 | 2.1585E+00 |
| A4 = | 2.4625E−01 | 6.4938E−01 | −3.4394E−01 | 6.4328E−02 |
| A6 = | −1.3892E−01 | −1.9963E+00 | 5.4667E−01 | −1.6425E+00 |
| A8 = | 1.2495E−01 | 6.4914E+00 | −9.1855E+00 | 7.5544E+00 |
| A10 = | 1.4658E−02 | −9.9995E+00 | 8.4688E+01 | −1.1938E+01 |
| A12 = | −1.7526E−02 | 5.4343E+00 | −3.2814E+02 | 2.4748E−01 |
| Surface # | 6 | 7 | 8 | 9 |
| k = | −6.1573E+00 | −4.2416E−01 | −7.3489E+00 | −2.5076E+00 |
| A4 = | −1.8506E+00 | −8.0997E−02 | 4.4862E−01 | −4.3925E−01 |
| A6 = | 2.9189E+00 | 2.1319E−01 | −3.0450E+00 | 1.0853E−01 |

TABLE 7-continued

| Aspheric Coefficients | | | |
|---|---|---|---|
| A8 = | −1.2192E+01 | 9.3724E−01 | 8.0802E+00 | 7.7712E−01 |
| A10 = | 4.2022E+01 | −5.5082E+00 | −1.2157E+01 | −1.4753E+00 |
| A12 = | −3.7752E+01 | 1.2944E+01 | 1.0314E+01 | 1.1585E+00 |
| A14 = | | | −4.6868E+00 | −4.3666E−01 |
| A16 = | | | 8.9835E−01 | 6.4559E−02 |

The equation of the aspheric surface profiles of the third embodiment has the same form as that of the first embodiment. Moreover, the description of the factors in the relations is as those set forth in the first embodiment, but the values of the relations of the third embodiment are listed in the following TABLE 8.

TABLE 8

| Embodiment 3 | | | |
|---|---|---|---|
| f [mm] | 1.40 | |f/f1| + |f/f2| + |f/f3| + |f/f4| | 1.13 |
| Fno | 1.48 | T12/(T23 + T34) | 1.64 |
| HFOV [deg.] | 44.2 | SL/TL | 0.74 |
| TL/ΣCT | 1.73 | R4/|R3| | −0.06 |
| f/f1 | 0.14 | |SAG32|/CT3 | 1.41 |
| f/|R3| | 0.06 | | |

Embodiment 4

Figure 4A:
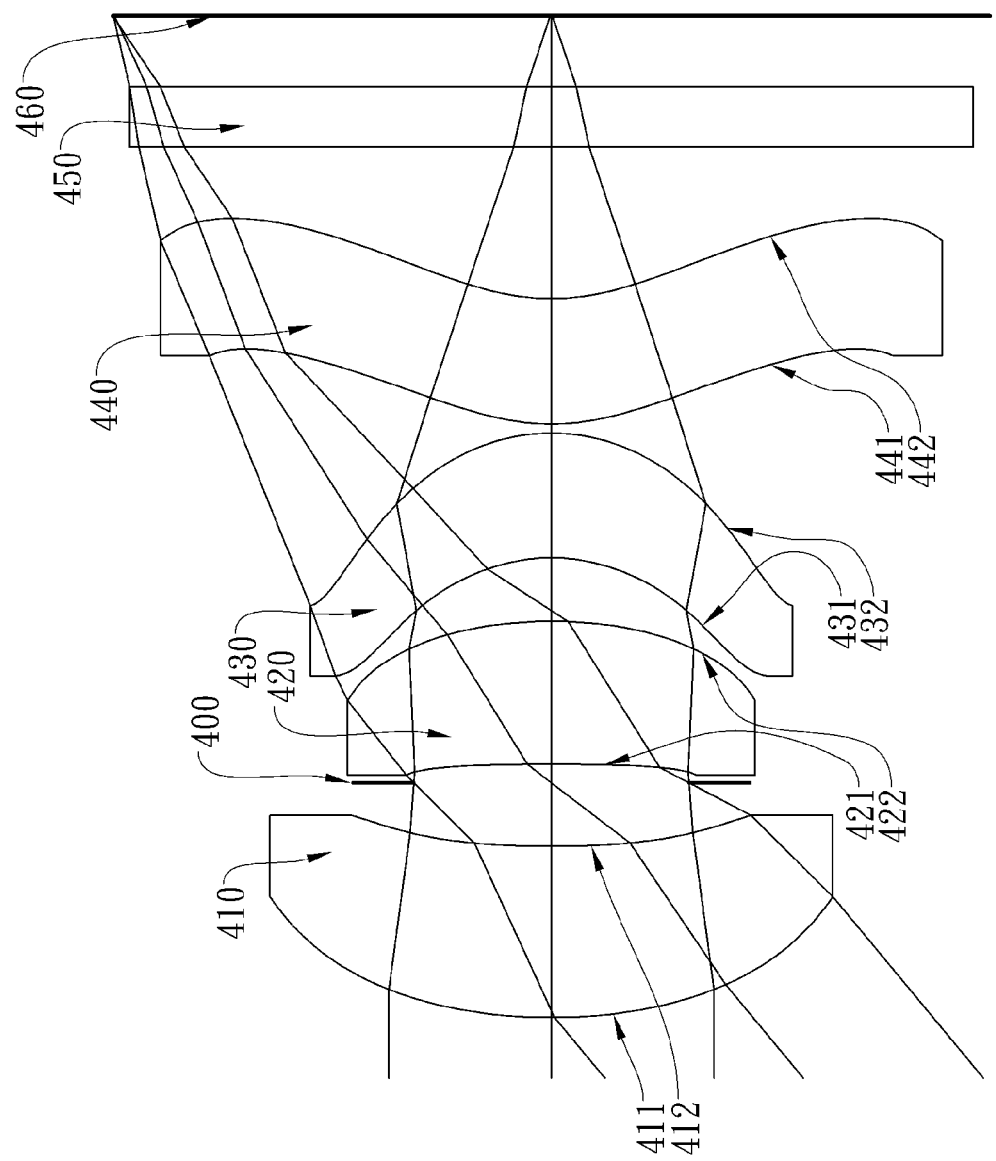
FIG. 4A shows an image capturing lens system in accordance with the fourth embodiment of the present disclosure.
Figure 4B:
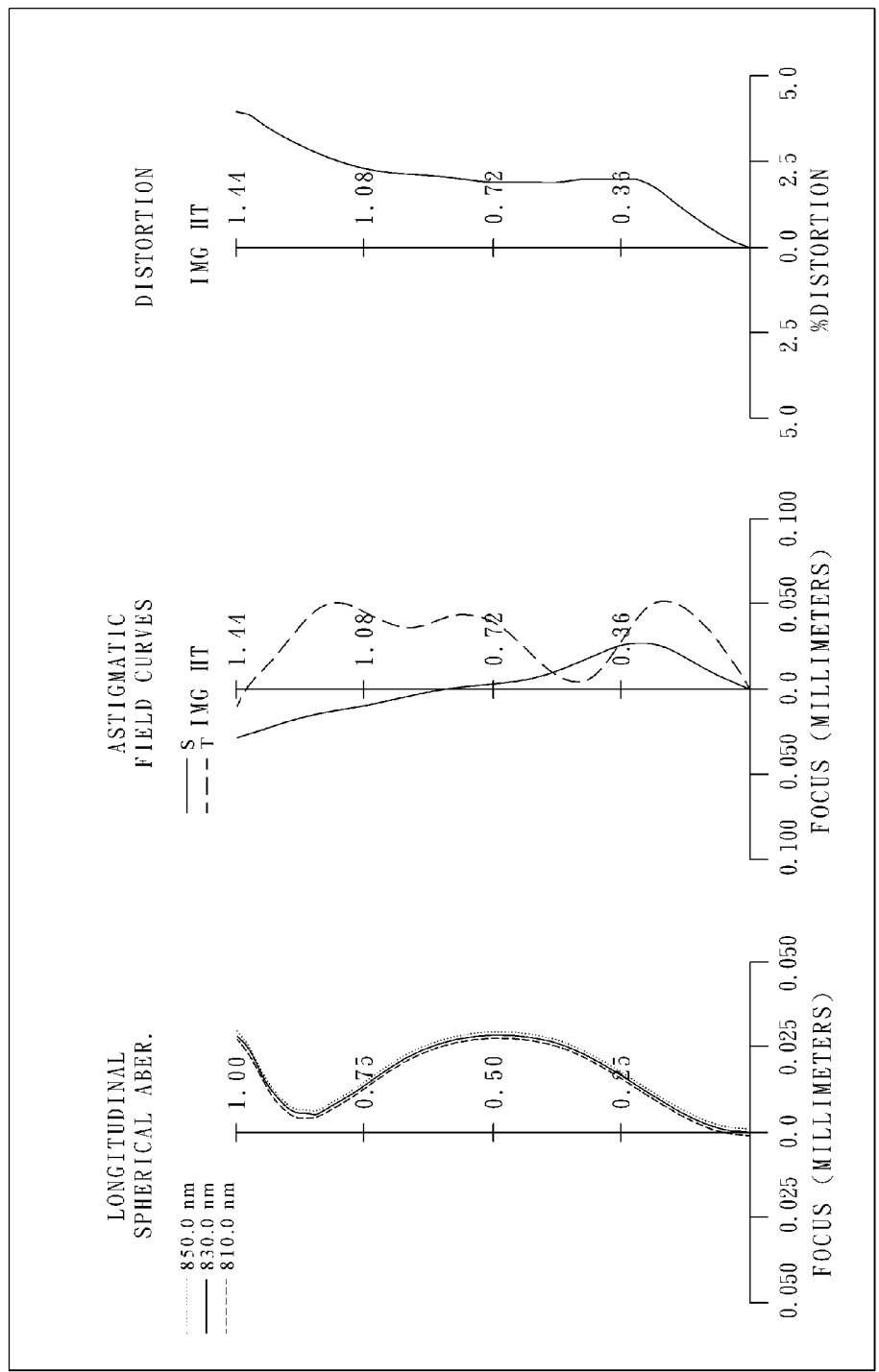
FIG. 4B shows the aberration curves of the fourth embodiment of the present disclosure.

FIG. 4A shows an image capturing lens system in accordance with the fourth embodiment of the present disclosure, FIG. 4B shows the aberration curves of the fourth embodiment of the present disclosure. The image capturing lens system of the fourth embodiment of the present disclosure mainly comprises four lens elements, in order from an object side to an image side:

a plastic first lens element 410 with positive refractive power having a convex object-side surface 411 at the paraxial region, a concave image-side surface 412 at the paraxial region, and both of the object-side surface 411 and image-side surface 412 thereof being aspheric;

a plastic second lens element 420 with positive refractive power having a concave object-side surface 421 at the paraxial region, a convex image-side surface 422 at the paraxial region, and both of the object-side surface 421 and image-side surface 422 thereof being aspheric;

a plastic third lens element 430 with positive refractive power having a concave object-side surface 431 at the paraxial region, a convex image-side surface 432 at the paraxial region, and both of the object-side surface 431 and image-side surface 432 thereof being aspheric; and a plastic fourth lens element 440 with positive refractive power having a convex object-side surface 441 at the paraxial region, a concave at the paraxial region and convex at the peripheral region image-side surface 442 at the paraxial region, and both of the object-side surface 441 and image-side surface 442 thereof being aspheric;

wherein the image capturing lens system further comprises a stop 400 disposed between the first lens element 410 and the second lens element 420, the image capturing lens system further comprises a filter element 450 disposed between the fourth lens element 440 and the image plane 460, and the filter element 450 is made of glass and has no influence on the focal length of the image capturing lens system.

The detailed optical data of the fourth embodiment is shown in TABLE 9, the aspheric surface data is shown in TABLE 10, wherein the units of the curvature radius, the thickness and the focal length are mm, and HFOV is half of the maximal field of view.

TABLE 9

| (Embodiment 4) | | | | | | |
|---|---|---|---|---|---|---|
| f = 1.66 mm, Fno = 1.55, HFOV = 39.6 deg, | | | | | | |
| Surface # | | Curvature Radius | | Thickness | Material | Index | Focal Length |
| 0 | Object | Plano | | Infinity | | | |
| 1 | Lens 1 | 1.742 | ASP | 0.565 | Plastic APEL-5514ML | 1.537 | 5.95 |
| 2 | | 3.394 | ASP | 0.210 | | | |
| 3 | Ape. Stop. | Plano | | 0.061 | | | |
| 4 | Lens 2 | −10.131 | ASP | 0.472 | Plastic ZEONEX E48R | 1.523 | 3.19 |
| 5 | | −1.457 | ASP | 0.210 | | | |
| 6 | Lens 3 | −0.569 | ASP | 0.411 | Plastic APEL-5514ML | 1.537 | 9.48 |
| 7 | | −0.641 | ASP | 0.030 | | | |
| 8 | Lens 4 | 0.704 | ASP | 0.414 | Plastic ZEONEX E48R | 1.523 | 6.06 |
| 9 | | 0.722 | ASP | 0.500 | | | |
| 10 | Filter | Plano | | 0.200 | Glass HOYA BSC7 | 1.510 | — |
| 11 | | Plano | | 0.233 | | | |
| 12 | Image | Plano | | — | | | |

* The reference wavelength for the Focal length and refractive index calculations is 830 nm.

TABLE 10

| | Aspheric Coefficients | | | |
|---|---|---|---|---|
| Surface # | 1 | 2 | 4 | 5 |
| k = | −5.7036E+00 | −9.6523E+00 | −1.0000E+00 | 1.4875E+00 |
| A4 = | 2.2686E−01 | 4.3635E−01 | −1.1263E−01 | −6.6013E−02 |
| A6 = | −5.1029E−02 | −1.4191E+00 | −1.0374E+00 | −1.5308E+00 |
| A8 = | 7.4416E−02 | 6.7485E+00 | −8.6736E+00 | 6.3431E+00 |
| A10 = | 1.2087E−01 | −1.6105E+01 | 1.0225E+02 | −1.0253E+01 |
| A12 = | −7.5818E−02 | 1.2916E+01 | −3.2070E+02 | 5.6228E−01 |
| Surface # | 6 | 7 | 8 | 9 |
| k = | −5.6489E+00 | −4.2237E−01 | −7.8430E+00 | −2.5414E+00 |
| A4 = | −1.7122E+00 | −2.2899E−01 | 6.0448E−01 | −3.6929E−01 |
| A6 = | 2.5076E+00 | 4.2155E−01 | −3.3330E+00 | 4.3014E−02 |
| A8 = | −1.2894E+01 | 1.0657E+00 | 8.4243E+00 | 7.9475E−01 |
| A10 = | 4.2264E+01 | −6.3799E+00 | −1.2288E+01 | −1.4423E+00 |
| A12 = | −3.5983E+01 | 9.8457E+00 | 1.0333E+01 | 1.1550E+00 |
| A14 = | | | −4.6424E+00 | −4.4972E−01 |
| A16 = | | | 8.5771E−01 | 6.8336E−02 |

The equation of the aspheric surface profiles of the fourth embodiment has the same form as that of the first embodiment. Moreover, the description of the factors in the relations is as those set forth in the first embodiment, but the values of the relations of the fourth embodiment are listed in the following TABLE 11.

TABLE 11

| Embodment 4 | | | |
|---|---|---|---|
| f [mm] | 1.66 | $|f/f1| + |f/f2| + |f/f3| + |f/f4|$ | 1.25 |
| Fno | 1.55 | T12/(T23 + T34) | 1.13 |
| HFOV [deg.] | 39.6 | SL/TL | 0.77 |
| TL/ΣCT | 1.78 | R4/|R3| | −0.14 |
| f/f1 | 0.28 | |SAG32|/CT3 | 1.39 |
| f/|R3| | 0.16 | | |

Embodiment 5

Figure 5A:
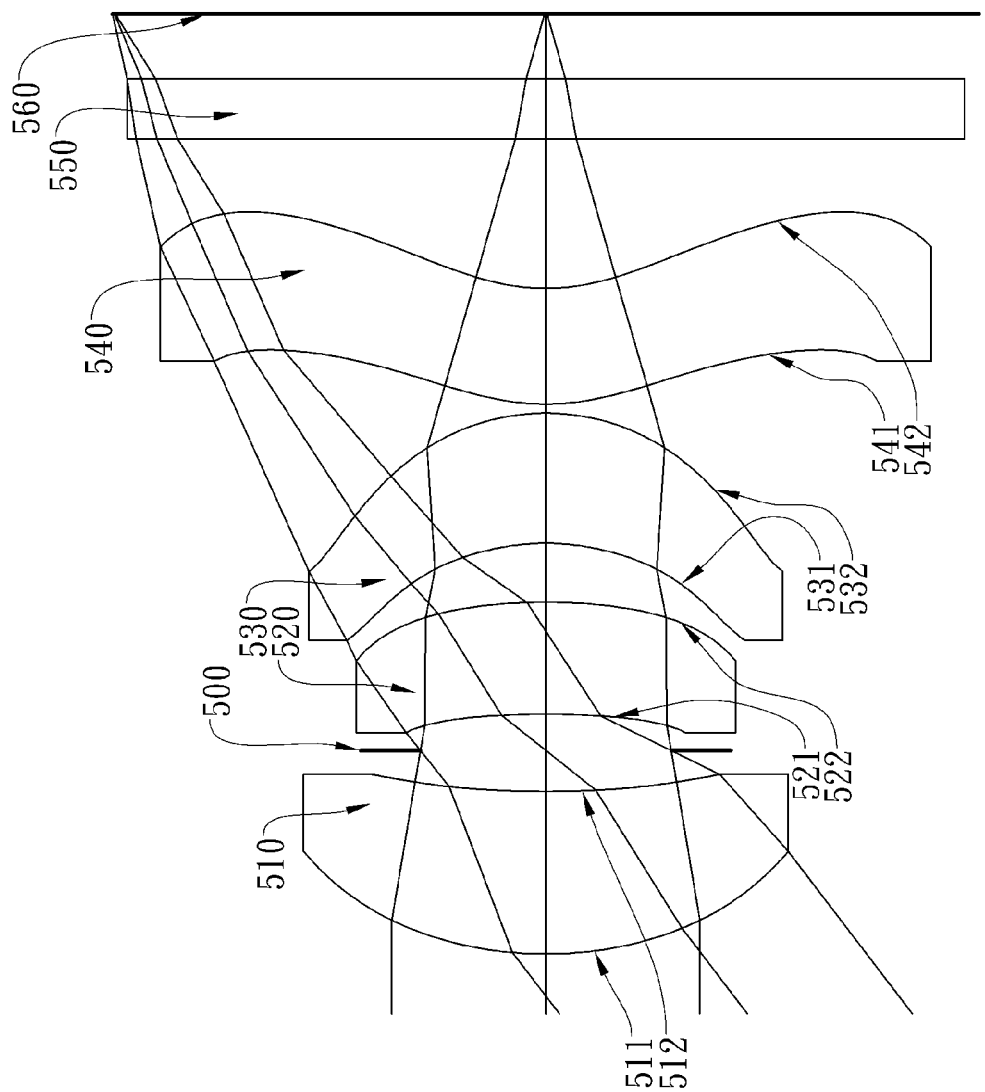
FIG. 5A shows an image capturing lens system in accordance with the fifth embodiment of the present disclosure.
Figure 5B:
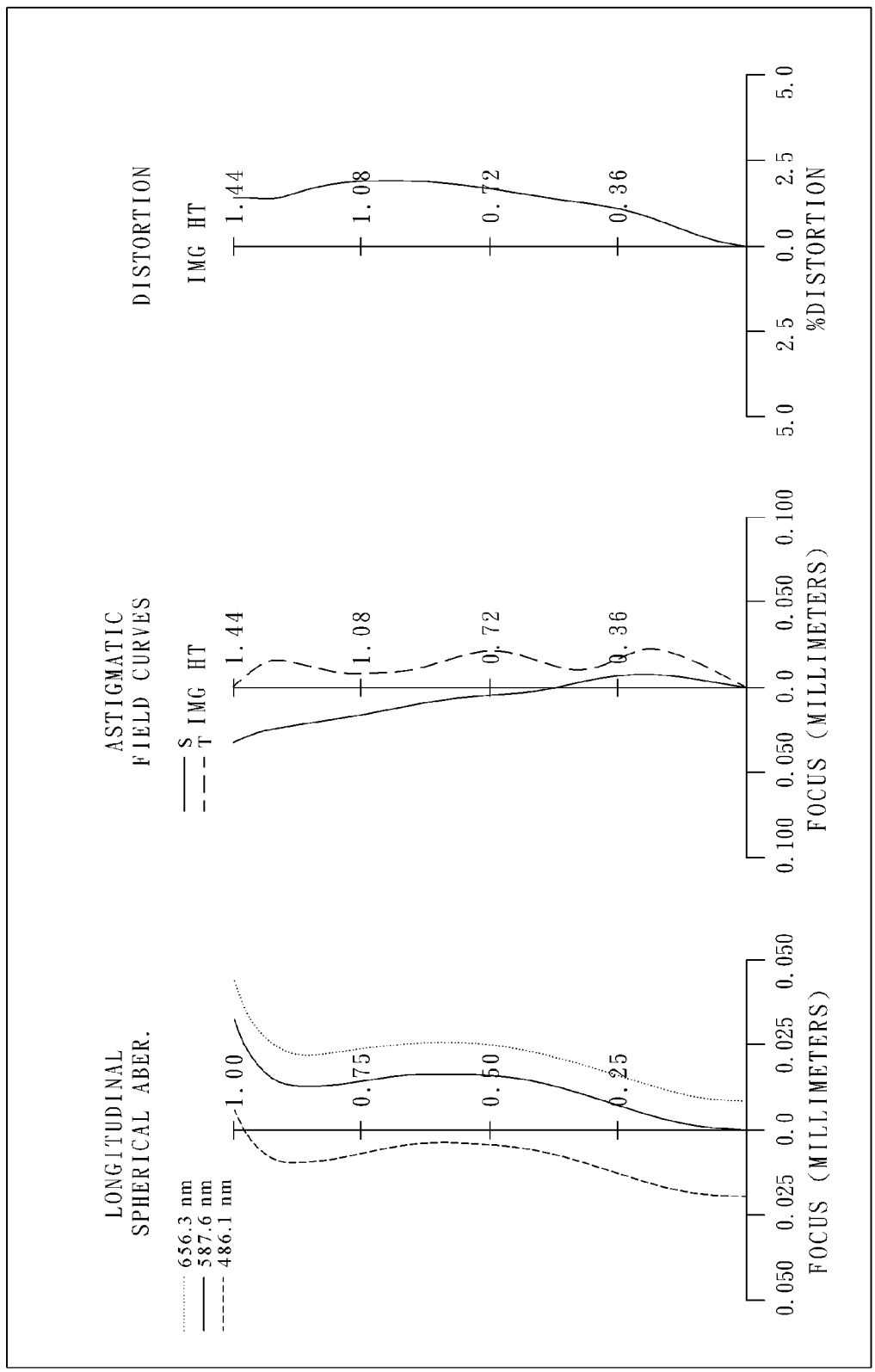
FIG. 5B shows the aberration curves of the fifth embodiment of the present disclosure.

FIG. 5A shows an image capturing lens system in accordance with the fifth embodiment of the present disclosure, FIG. 5B shows the aberration curves of the fifth embodiment of the present disclosure. The image capturing lens system of the fifth embodiment of the present disclosure mainly comprises four lens elements, in order from an object side to an image side:

a plastic first lens element 510 with positive refractive power having a convex object-side surface 511 at the paraxial region, a concave image-side surface 512 at the paraxial region, and both of the object-side surface 511 and image-side surface 512 thereof being aspheric;

a plastic second lens element 520 with positive refractive power having a concave object-side surface 521 at the paraxial region, a convex image-side surface 522 at the paraxial region, and both of the object-side surface 521 and image-side surface 522 thereof being aspheric;

a plastic third lens element 530 with positive refractive power having a concave object-side surface 531 at the paraxial region, a convex image-side surface 532 at the paraxial region, and both of the object-side surface 531 and image-side surface 532 thereof being aspheric; and a plastic fourth lens element 540 with positive refractive power having a convex object-side surface 541 at the paraxial region, a concave at the paraxial region and convex at the peripheral region image-side surface 542 at the paraxial region, and both of the object-side surface 541 and image-side surface 542 thereof being aspheric;

wherein the image capturing lens system further comprises a stop 500 disposed between the first lens element 510 and the second lens element 520, the image capturing lens system further comprises a filter element 550 disposed between the fourth lens element 540 and the image plane 560, and the filter element 550 is made of glass and has no influence on the focal length of the image capturing lens system.

The detailed optical data of the fifth embodiment is shown in TABLE 12, the aspheric surface data is shown in TABLE 13, wherein the units of the curvature radius, the thickness and the focal length are mm, and HFOV is half of the maximal field of view.

TABLE 12

| (Embodiment 5) f = 1.85 mm, Fno = 1.80, HFOV = 37.4 deg. | | | | | | | |
|---|---|---|---|---|---|---|---|
| Surface # | | Curvature Radius | | Thickness | Material | Index | Focal Length |
| 0 | Object | Plano | | Infinity | | | |
| 1 | Lens 1 | 1.283 | ASP | 0.543 | Plastic | APEL-5514ML | 1.544 | 3.46 |
| 2 | | 3.421 | ASP | 0.137 | | | |
| 3 | Ape. Stop. | Plano | | 0.121 | | | |
| 4 | Lens 2 | −3.387 | ASP | 0.375 | Plastic | APEL-5514ML | 1.544 | 7.13 |
| 5 | | −1.878 | ASP | 0.197 | | | |
| 6 | Lens 3 | −0.770 | ASP | 0.435 | Plastic | APEL-5514ML | 1.544 | 5.66 |
| 7 | | −0.739 | ASP | 0.030 | | | |
| 8 | Lens 4 | 0.759 | ASP | 0.387 | Plastic | APEL-5514ML | 1.544 | 16.55 |
| 9 | | 0.680 | ASP | 0.500 | | | |

TABLE 12-continued (Embodiment 5)
f = 1.85 mm, Fno = 1.80, HFOV = 37.4 deg,

| Surface # | | Curvature Radius | Thickness | Material | | Index | Focal Length |
|---|---|---|---|---|---|---|---|
| 10 | Filter | Plano | 0.200 | Glass | HOYA BSC7 | 1.517 | — |
| 11 | | Plano | 0.217 | | | | |
| 12 | Image | Plano | — | | | | |

* The reference wavelength for the Focal length and refractive index calculations is d-line (587.6 nm).

TABLE 13

Aspheric Coefficients

| Surface # | 1 | 2 | 4 | 5 |
|---|---|---|---|---|
| k = | −5.0234E+00 | −6.7600E+01 | −1.0000E+00 | 2.6639E+00 |
| A4 = | 3.4290E−01 | 3.4152E−01 | −4.0741E−01 | −2.1095E−02 |
| A6 = | −1.0413E−01 | −7.4287E−01 | 7.8106E−01 | −2.1451E+00 |
| A8 = | −7.4084E−02 | 2.9089E+00 | −1.5564E+01 | 6.2579E+00 |
| A10 = | 8.5154E−01 | −1.0357E+01 | 8.6938E+01 | −8.1263E+00 |
| A12 = | −7.5020E−01 | 1.1999E+01 | −2.3578E+02 | −2.7365E+00 |

| Surface # | 6 | 7 | 8 | 9 |
|---|---|---|---|---|
| k = | −1.0211E+01 | −2.5145E−01 | −7.1175E+00 | −1.3137E+00 |
| A4 = | −1.3561E+00 | −1.5788E−01 | 3.8403E−01 | −7.5928E−01 |
| A6 = | 2.4494E+00 | −5.3703E−02 | −3.1356E+00 | 3.3980E−01 |
| A8 = | −1.5126E+01 | 1.5635E+00 | 8.3962E+00 | 7.3120E−01 |
| A10 = | 3.9498E+01 | −5.3046E+00 | −1.2305E+01 | −1.4883E+00 |
| A12 = | −2.8194E+01 | 7.1559E+00 | 1.0317E+01 | 1.1655E+00 |
| A14 = | | | −4.6479E+00 | −4.3931E−01 |
| A16 = | | | 8.6823E−01 | 6.5238E−02 |

The equation of the aspheric surface profiles of the fifth embodiment has the same form as that of the first embodiment. Moreover, the description of the factors in the relations is as those set forth in the first embodiment, but the values of the relations of the fifth embodiment are listed in the following TABLE 14.

TABLE 14

Embodment 5

| f [mm] | 1.85 | |f/f1| + |f/f2| + |f/f3| + |f/f4| | 1.23 |
|---|---|---|---|
| Fno | 1.80 | T12/(T23 + T34) | 1.14 |
| HFOV [deg.] | 37.4 | SL/TL | 0.78 |
| TL/ΣCT | 1.81 | R4/|R3| | −0.55 |
| f/f1 | 0.53 | |SAG32|/CT3 | 1.22 |
| f/|R3| | 0.55 | | |

Embodiment 6

Figure 6A:
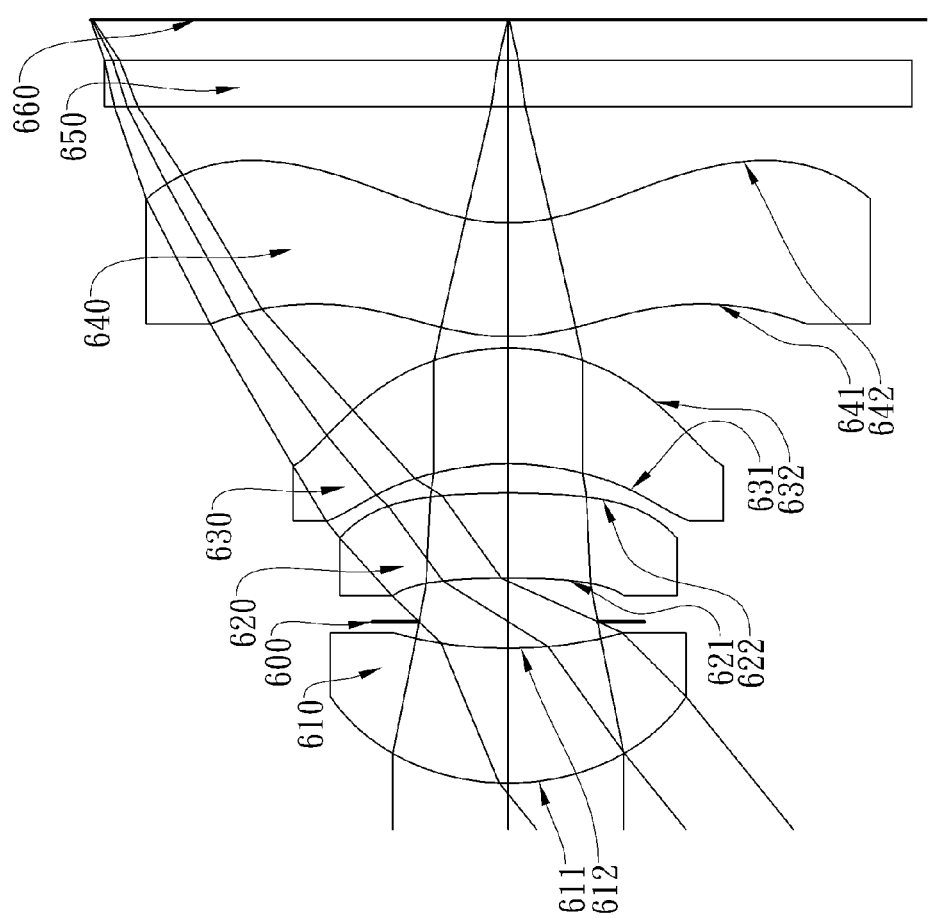
FIG. 6A shows an image capturing lens system in accordance with the sixth embodiment of the present disclosure.
Figure 6B:
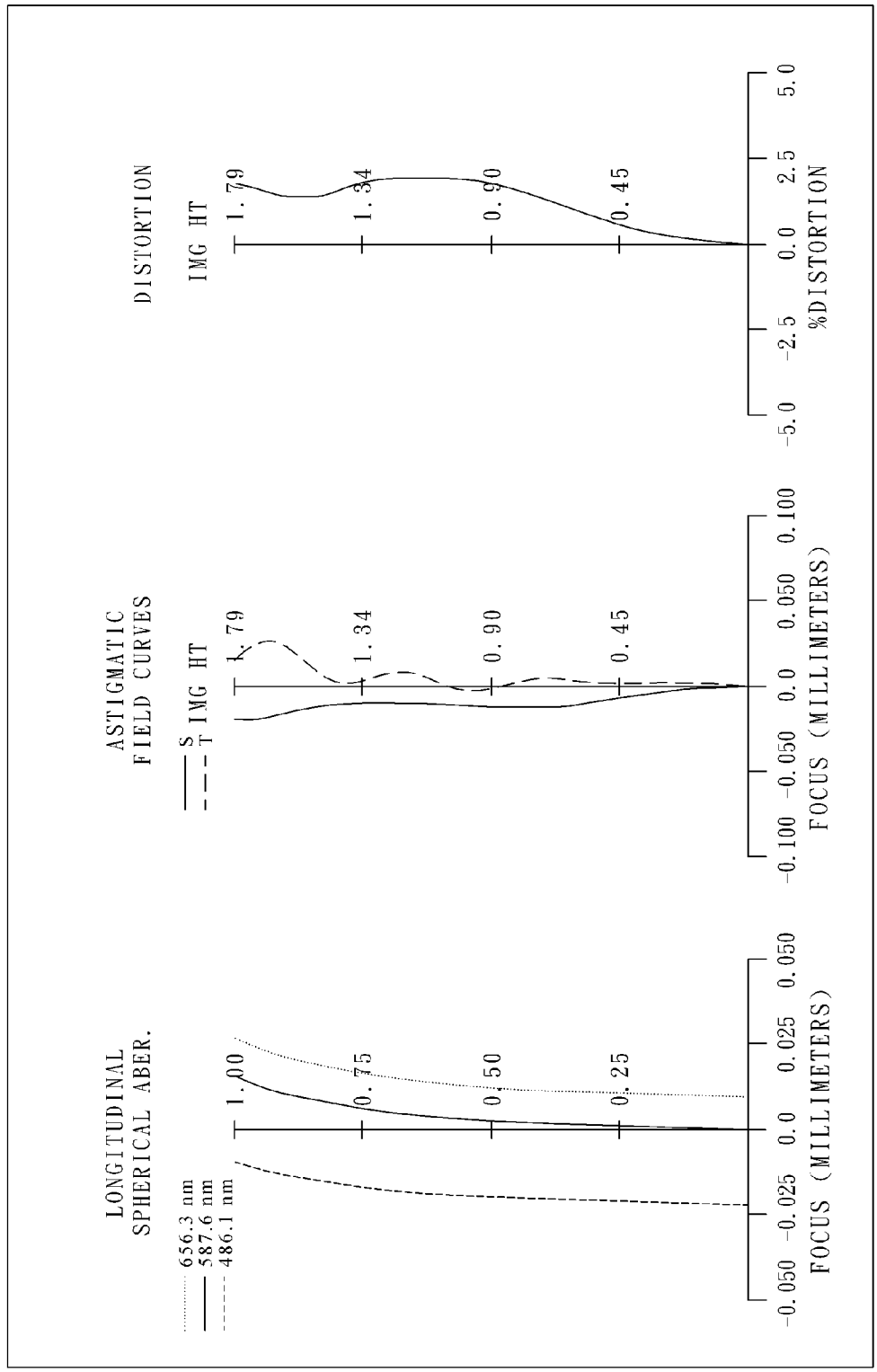
FIG. 6B shows the aberration curves of the sixth embodiment of the present disclosure.

FIG. 6A shows an image capturing lens system in accordance with the sixth embodiment of the present disclosure, FIG. 6B shows the aberration curves of the sixth embodiment of the present disclosure. The image capturing lens system of the sixth embodiment of the present disclosure mainly comprises four lens elements, in order from an object side to an image side:

a plastic first lens element 610 with positive refractive power having a convex object-side surface 611 at the paraxial region, a concave image-side surface 612 at the paraxial region, and both of the object-side surface 611 and image-side surface 612 thereof being aspheric;

a plastic second lens element 620 with positive refractive power having a concave object-side surface 621 at the paraxial region, a convex image-side surface 622 at the paraxial region, and both of the object-side surface 621 and image-side surface 622 thereof being aspheric;

a plastic third lens element 630 with positive refractive power having a concave object-side surface 631 at the paraxial region, a convex image-side surface 632 at the paraxial region, and both of the object-side surface 631 and image-side surface 632 thereof being aspheric; and a plastic fourth lens element 640 with positive refractive power having a convex object-side surface 641 at the paraxial region, a concave at the paraxial region and convex at the peripheral region image-side surface 642 at the paraxial region, and both of the object-side surface 641 and image-side surface 642 thereof being aspheric;

wherein the image capturing lens system further comprises a stop 600 disposed between the first lens element 610 and the second lens element 620, the image capturing lens system further comprises a filter element 650 disposed between the fourth lens element 640 and the image plane 660, and the filter element 650 is made of glass and has no influence on the focal length of the image capturing lens system.

The detailed optical data of the sixth embodiment is shown in TABLE 15, the aspheric surface data is shown in TABLE 16, wherein the units of the curvature radius, the thickness and the focal length are mm, and HFOV is half of the maximal field of view.

TABLE 15

(Embodiment 6)
f = 2.19 mm, Fno = 2.20, HFOV = 38.8 deg,

| Surface # | | Curvature Radius | | Thickness | Material | Index | Abbe Number | Focal Length |
|---|---|---|---|---|---|---|---|---|
| 0 | Object | Plano | | Infinity | | | | |
| 1 | Lens 1 | 1.061 | ASP | 0.581 | Plastic | 1.572 | 58.0 | 3.20 |
| 2 | | 2.017 | ASP | 0.114 | | | | |
| 3 | Ape. Stop. | Plano | | 0.187 | | | | |
| 4 | Lens 2 | −4.834 | ASP | 0.367 | Plastic | 1.572 | 58.0 | 30.16 |
| 5 | | −3.880 | ASP | 0.126 | | | | |

TABLE 15-continued (Embodiment 6)
f = 2.19 mm, Fno = 2.20, HFOV = 38.8 deg.

| Surface # | | Curvature Radius | | Thickness | Material | Index | Abbe Number | Focal Length |
|---|---|---|---|---|---|---|---|---|
| 6 | Lens 3 | −1.136 | ASP | 0.498 | Plastic | 1.572 | 58.0 | 6.50 |
| 7 | | −1.009 | ASP | 0.050 | | | | |
| 8 | Lens 4 | 0.941 | ASP | 0.489 | Plastic | 1.535 | 56.3 | 26.74 |
| 9 | | 0.825 | ASP | 0.500 | | | | |
| 10 | Filter | Plano | | 0.200 | Glass | 1.517 | 64.2 | — |
| 11 | | Plano | | 0.175 | | | | |
| 12 | Image | Plano | | — | | | | |

* The reference wavelength for the Focal length and refractive index calculations is d-line (587.6 nm).

TABLE 16

Aspheric Coefficients

| Surface # | 1 | 2 | 4 | 5 |
|---|---|---|---|---|
| k = | −2.4696E+00 | −3.7219E+00 | 8.5383E−01 | 3.0000E+00 |
| A4 = | 2.9798E−01 | 1.6205E−01 | −5.0798E−01 | −6.0171E−02 |
| A6 = | 5.6312E−02 | −1.7049E−01 | 1.4106E−01 | −1.2535E+00 |
| A8 = | 2.2565E−02 | 2.0773E+00 | −8.5905E+00 | 1.8543E+00 |
| A10 = | 2.1895E−01 | −1.0781E+01 | 4.4007E+01 | −1.5774E+00 |
| A12 = | 9.1497E−02 | 1.5518E+01 | −1.2344E+02 | −1.9845E−01 |

| Surface # | 6 | 7 | 8 | 9 |
|---|---|---|---|---|
| k = | −1.6097E+01 | −5.3463E−02 | −6.0677E+00 | −9.9395E−01 |
| A4 = | −3.9196E−01 | −7.5108E−02 | −3.1835E−03 | −5.1347E−01 |
| A6 = | 7.7993E−02 | −1.9440E−01 | −9.3058E−01 | 1.3649E−01 |
| A8 = | −2.3199E+00 | 5.7091E−01 | 1.7955E+00 | 1.6326E−01 |
| A10 = | 6.8070E+00 | −4.8568E−01 | −1.7219E+00 | −2.1285E−01 |
| A12 = | −4.5081E+00 | 4.3017E−01 | 9.3013E−01 | 1.0482E−01 |
| A14 = | | | −2.7054E−01 | −2.4523E−02 |
| A16 = | | | 3.3074E−02 | 2.2411E−03 |

The equation of the aspheric surface profiles of the sixth embodiment has the same form as that of the first embodiment. Moreover, the description of the factors in the relations is as those set forth in the first embodiment, but the values of the relations of the sixth embodiment are listed in the following TABLE 17.

TABLE 17

| Embodment 6 | | | |
|---|---|---|---|
| f [mm] | 2.19 | |f/f1| + |f/f2| + |f/f3| + |f/f4| | 1.18 |
| Fno | 2.20 | T12/(T23 + T34) | 1.71 |
| HFOV [deg.] | 38.8 | SL/TL | 0.79 |
| TL/ΣCT | 1.70 | R4/|R3| | −0.80 |
| f/f1 | 0.68 | |SAG32|/CT3 | 0.98 |
| f/|R3| | 0.45 | | |

Embodiment 7

Figure 7A:
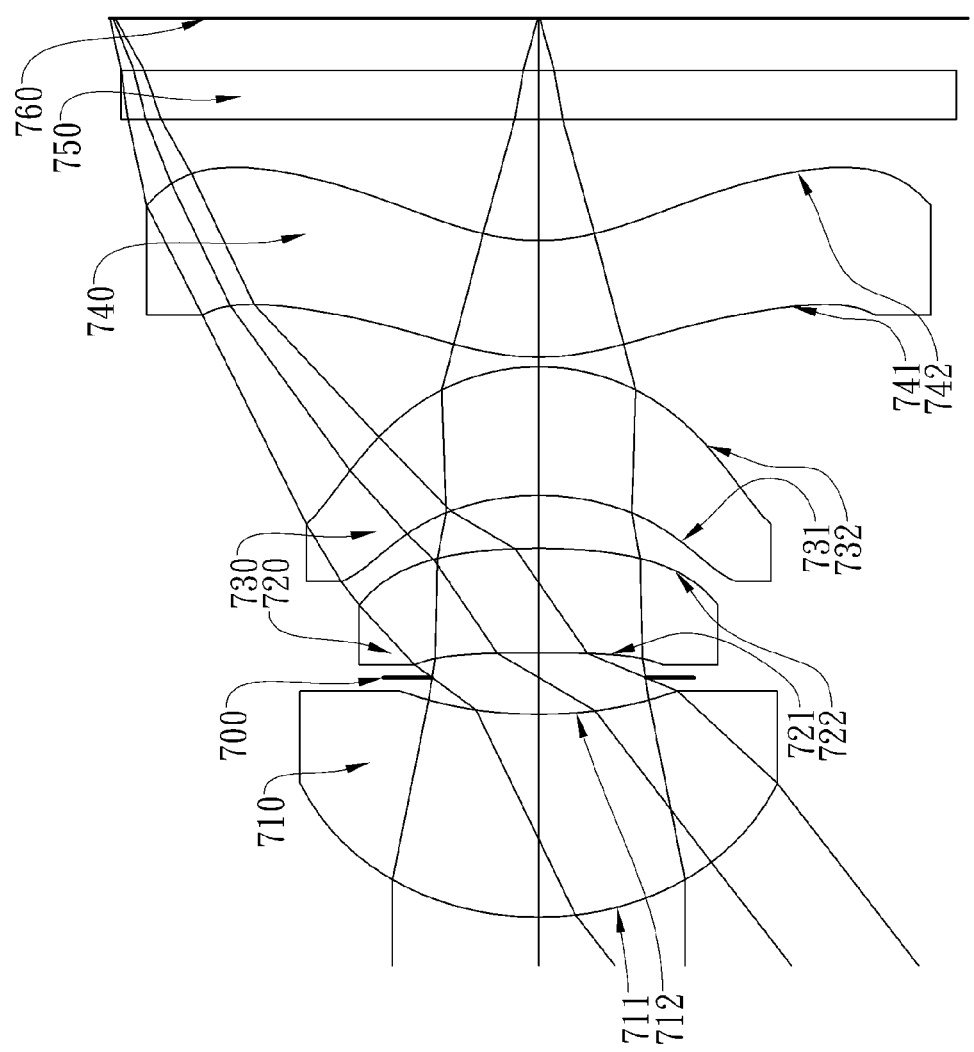
FIG. 7A shows an image capturing lens system in accordance with the seventh embodiment of the present disclosure.
Figure 7B:
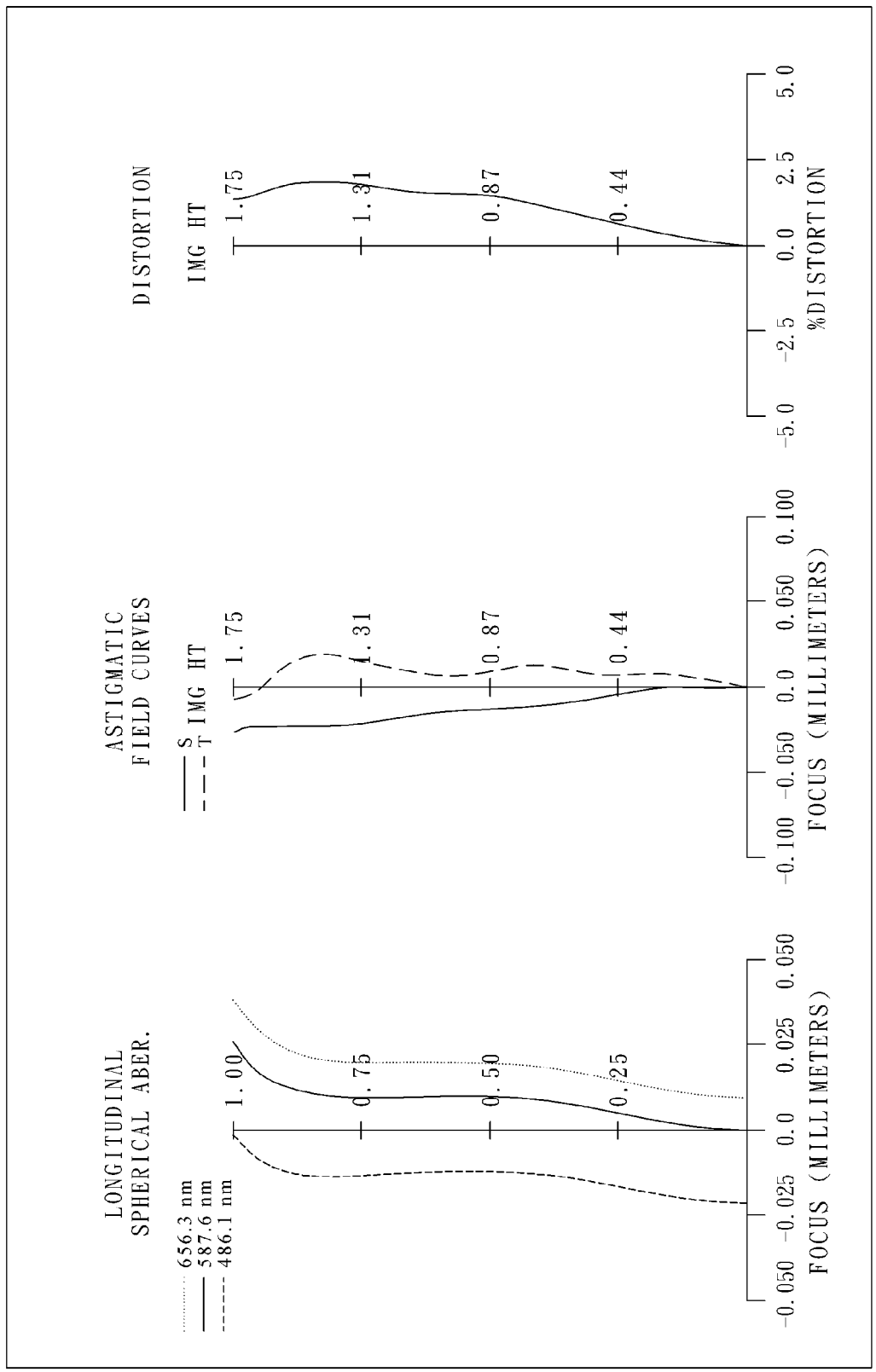
FIG. 7B shows the aberration curves of the seventh embodiment of the present disclosure.

FIG. 7A shows an image capturing lens system in accordance with the seventh embodiment of the present disclosure, FIG. 7B shows the aberration curves of the seventh embodiment of the present disclosure. The image capturing lens system of the seventh embodiment of the present disclosure mainly comprises four lens elements, in order from an object side to an image side:

a plastic first lens element 710 with positive refractive power having a convex object-side surface 711 at the paraxial region, a concave image-side surface 712 at the paraxial region, and both of the object-side surface 711 and image-side surface 712 thereof being aspheric;

a plastic second lens element 720 with positive refractive power having a concave object-side surface 721 at the paraxial region, a convex image-side surface 722 at the paraxial region, and both of the object-side surface 721 and image-side surface 722 thereof being aspheric;

a plastic third lens element 730 with positive refractive power having a concave object-side surface 731 at the paraxial region, a convex image-side surface 732 at the paraxial region, and both of the object-side surface 731 and image-side surface 732 thereof being aspheric; and a plastic fourth lens element 740 with positive refractive power having a convex object-side surface 741 at the paraxial region, a concave at the paraxial region and convex at the peripheral region image-side surface 742 at the paraxial region, and both of the object-side surface 741 and image-side surface 742 thereof being aspheric;

wherein the image capturing lens system further comprises a stop 700 disposed between the first lens element 710 and the second lens element 720, the image capturing lens system further comprises a filter element 750 disposed between the fourth lens element 740 and the image plane 760, and the filter element 750 is made of glass and has no influence on the focal length of the image capturing lens system.

The detailed optical data of the seventh embodiment is shown in TABLE 18, the aspheric surface data is shown in TABLE 19, wherein the units of the curvature radius, the thickness and the focal length are mm, and HFOV is half of the maximal field of view.

TABLE 18

(Embodiment 7)
f = 2.22 mm, Fno = 1.85, HFOV = 37.8 deg.

| Surface # | | Curvature Radius | | Thickness | Material | Index | Abbe Number | Focal Length |
|---|---|---|---|---|---|---|---|---|
| 0 | Object | Plano | | Infinity | | | | |
| 1 | Lens 1 | 1.286 | ASP | 0.835 | Plastic | 1.572 | 58.0 | 4.61 |

TABLE 18-continued (Embodiment 7)
f = 2.22 mm, Fno = 1.85, HFOV = 37.8 deg.

| Surface # | | Curvature Radius | | Thickness | Material | Index | Abbe Number | Focal Length |
|---|---|---|---|---|---|---|---|---|
| 2 | | 1.919 | ASP | 0.151 | | | | |
| 3 | Ape. Stop. | Plano | | 0.102 | | | | |
| 4 | Lens 2 | −8.807 | ASP | 0.430 | Plastic | 1.572 | 58.0 | 6.29 |
| 5 | | −2.600 | ASP | 0.219 | | | | |
| 6 | Lens 3 | −0.987 | ASP | 0.529 | Plastic | 1.572 | 58.0 | 5.15 |
| 7 | | −0.884 | ASP | 0.040 | | | | |
| 8 | Lens 4 | 1.015 | ASP | 0.480 | Plastic | 1.572 | 58.0 | 39.31 |
| 9 | | 0.880 | ASP | 0.500 | | | | |
| 10 | Filter | Plano | | 0.200 | Glass | 1.517 | 64.2 | — |
| 11 | | Plano | | 0.215 | | | | |
| 12 | Image | Plano | | — | | | | |

\* The reference wavelength for the Focal length and refractive index calculations is d-line (587.6 nm).

TABLE 19

Aspheric Coefficients

| Surface # | 1 | 2 | 4 | 5 |
|---|---|---|---|---|
| k = | −2.2159E+00 | −1.5106E+00 | 3.4244E−02 | 1.2634E+00 |
| A4 = | 1.5460E−01 | 1.6811E−01 | −3.3353E−01 | −1.1122E−01 |
| A6 = | 2.4853E−02 | −3.8370E−01 | 3.3279E−01 | −1.0588E+00 |
| A8 = | 4.3766E−02 | 3.4914E+00 | −5.5942E+00 | 2.2756E+00 |
| A10 = | −3.8498E−02 | −1.3427E+01 | 2.0147E+01 | −2.8638E+00 |
| A12 = | 6.9196E−02 | 1.4932E+01 | −5.1387E+01 | 6.3416E−01 |

| Surface # | 6 | 7 | 8 | 9 |
|---|---|---|---|---|
| k = | −9.5251E+00 | −3.1427E−01 | −6.4536E+00 | −8.6283E−01 |
| A4 = | −6.1581E−01 | −4.1948E−02 | 1.1674E−01 | −4.7014E−01 |
| A6 = | 1.6008E−02 | −2.4578E−01 | −9.4993E−01 | 9.2556E−02 |
| A8 = | −2.2186E+00 | 4.6557E−01 | 1.7803E+00 | 1.9004E−01 |
| A10 = | 7.2778E+00 | −4.7561E−01 | −1.7186E+00 | −2.1806E−01 |
| A12 = | −4.7939E+00 | 4.6283E−01 | 9.3187E−01 | 1.0373E−01 |
| A14 = | | | −2.7074E−01 | −2.4516E−02 |
| A16 = | | | 3.2684E−02 | 2.3282E−03 |

The equation of the aspheric surface profiles of the seventh embodiment has the same form as that of the first embodiment. Moreover, the description of the factors in the relations is as those set forth in the first embodiment, but the values of the relations of the seventh embodiment are listed in the following TABLE 20.

TABLE 20

Embodiment 7

| f [mm] | 2.22 | |f/f1| + |f/f2| + |f/f3| + |f/f4| | 1.32 |
|---|---|---|---|
| Fno | 1.85 | T12/(T23 + T34) | 0.98 |
| HFOV [deg.] | 37.8 | SL/TL | 0.73 |
| TL/ΣCT | 1.63 | R4/|R3| | −0.30 |
| f/f1 | 0.48 | |SAG32|/CT3 | 1.22 |
| f/|R3| | 0.25 | | |

Embodiment 8

Figure 8A:
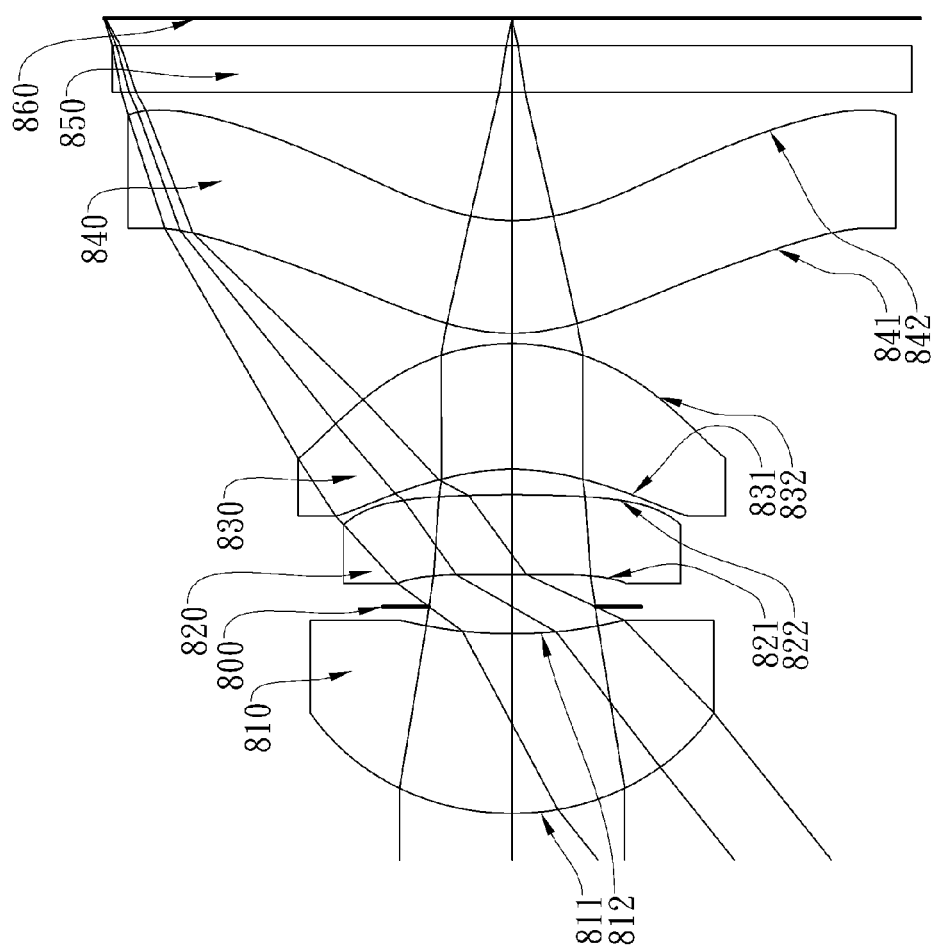
FIG. 8A shows an image capturing lens system in accordance with the eighth embodiment of the present disclosure.
Figure 8B:
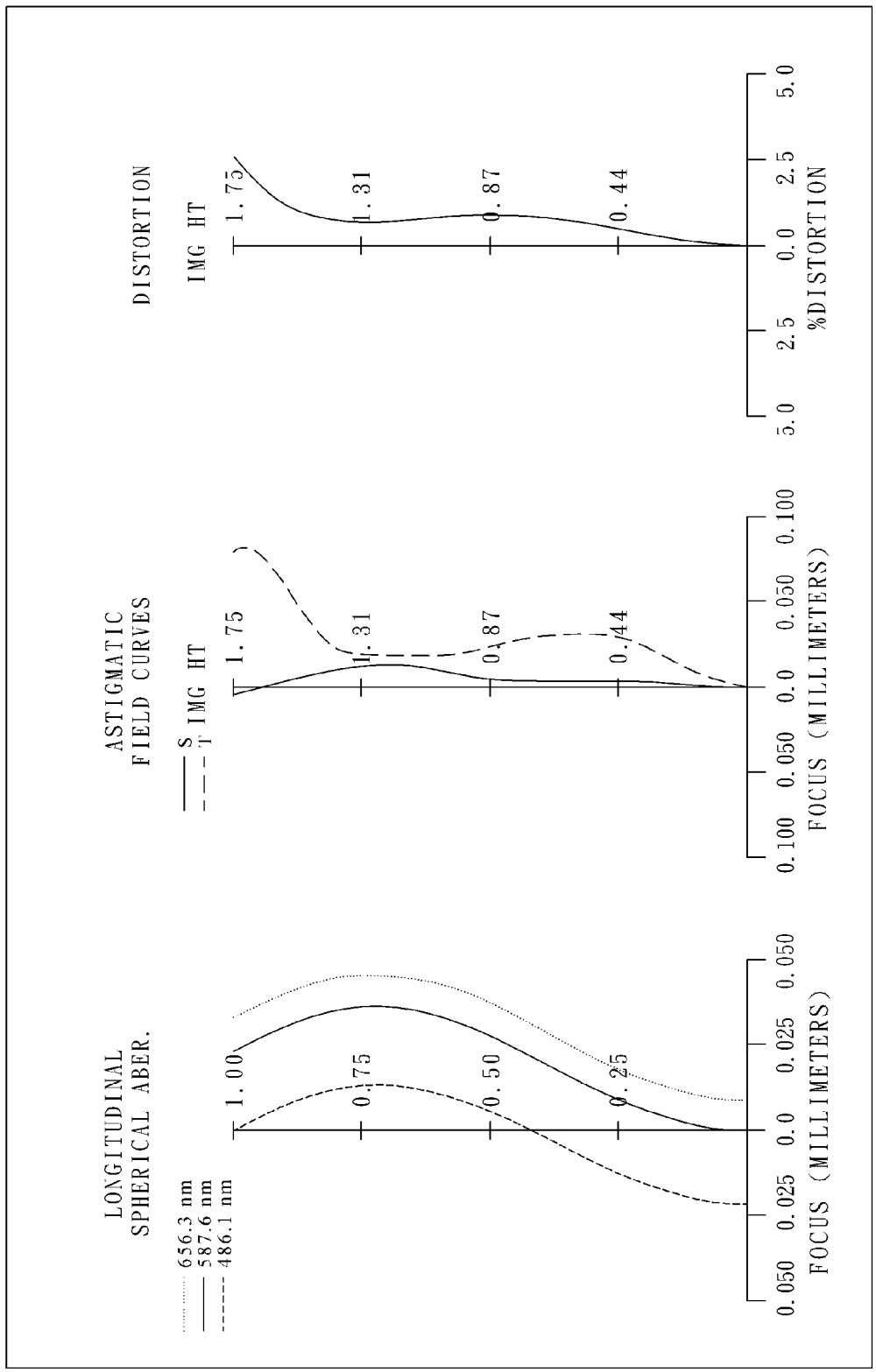
FIG. 8B shows the aberration curves of the eighth embodiment of the present disclosure.

FIG. 8A shows an image capturing lens system in accordance with the eighth embodiment of the present disclosure, FIG. 8B shows the aberration curves of the eighth embodiment of the present disclosure. The image capturing lens system of the eighth embodiment of the present disclosure mainly comprises four lens elements, in order from an object side to an image side:

a plastic first lens element 810 with positive refractive power having a convex object-side surface 811 at the paraxial region, a concave image-side surface 812 at the paraxial region, and both of the object-side surface 811 and image-side surface 812 thereof being aspheric;

a plastic second lens element 820 with positive refractive power having a convex object-side surface 821 at the paraxial region, a convex image-side surface 822 at the paraxial region, and both of the object-side surface 821 and image-side surface 822 thereof being aspheric;

a plastic third lens element 830 with positive refractive power having a concave object-side surface 831 at the paraxial region, a convex image-side surface 832 at the paraxial region, and both of the object-side surface 831 and image-side surface 832 thereof being aspheric; and a plastic fourth lens element 840 with positive refractive power having a convex object-side surface 841 at the paraxial region, a concave at the paraxial region and convex at the peripheral region image-side surface 842 at the paraxial region, and both of the object-side surface 841 and image-side surface 842 thereof being aspheric;

wherein the image capturing lens system further comprises a stop 800 disposed between the first lens element 810 and the second lens element 820, the image capturing lens system further comprises a filter element 850 disposed between the fourth lens element 840 and the image plane 860, and the filter element 850 is made of glass and has no influence on the focal length of the image capturing lens system.

The detailed optical data of the eighth embodiment is shown in TABLE 21, the aspheric surface data is shown in TABLE 22, wherein the units of the curvature radius, the thickness and the focal length are mm, and HFOV is half of the maximal field of view.

TABLE 21

(Embodiment 8)
f = 2.13 mm, Fno = 2.20, HFOV = 38.5 deg.

| Surface # | | Curvature Radius | | Thickness | Material | | Index | Focal Length |
|---|---|---|---|---|---|---|---|---|
| 0 | Object | Plano | | Infinity | | | | |
| 1 | Lens 1 | 1.145 | ASP | 0.772 | Plastic | ZEONEX K26R | 1.535 | 3.73 |
| 2 | | 2.055 | ASP | 0.117 | | | | |
| 3 | Ape. Stop. | Plano | | 0.138 | | | | |
| 4 | Lens 2 | 87.394 | ASP | 0.342 | Plastic | ZEONEX K26R | 1.535 | 11.01 |
| 5 | | −6.305 | ASP | 0.110 | | | | |
| 6 | Lens 3 | −0.984 | ASP | 0.540 | Plastic | ZEONEX K26R | 1.535 | 7.77 |
| 7 | | −0.948 | ASP | 0.045 | | | | |
| 8 | Lens 4 | 0.863 | ASP | 0.485 | Plastic | ZEONEX K26R | 1.535 | 9.20 |
| 9 | | 0.842 | ASP | 0.550 | | | | |
| 10 | Filter | Plano | | 0.200 | Glass | HOYA BSC7 | 1.517 | — |
| 11 | | Plano | | 0.119 | | | | |
| 12 | Image | Plano | | — | | | | |

\* The reference wavelength for the Focal length and refractive index calculations is d-line (587.6 nm).

TABLE 22

Aspheric Coefficients

| Surface # | 1 | 2 | 4 | 5 |
|---|---|---|---|---|
| k = | −2.1441E+00 | 1.7465E+00 | −1.4850E+02 | 3.0000E+00 |
| A4 = | 1.9448E−01 | 1.3497E−01 | −4.6762E−01 | −1.2858E−03 |
| A6 = | 4.1079E−02 | −8.7824E−01 | −1.8976E−01 | −6.3302E−01 |
| A8 = | 2.4388E−02 | 1.6457E+00 | −2.8546E+00 | 4.5759E−01 |
| A10 = | 7.3537E−02 | −2.0391E+00 | 3.2298E+00 | −6.1012E−01 |
| A12 = | −4.4226E−02 | 2.0664E+00 | −1.6437E+01 | −2.6417E−01 |

| Surface # | 6 | 7 | 8 | 9 |
|---|---|---|---|---|
| k = | −7.5874E+00 | −3.0768E−01 | −4.0916E+00 | −9.9348E+00 |
| A4 = | −1.4664E−01 | −4.7258E−02 | 7.9404E−02 | −3.4313E+00 |
| A6 = | 1.4174E−01 | −2.1122E−02 | −3.8437E−01 | 8.5785E+00 |
| A8 = | −4.8539E−01 | 1.9637E−01 | 4.9583E−01 | 3.9757E+00 |
| A10 = | 1.2741E+00 | −5.2954E−02 | −3.3084E−01 | −4.1162E+00 |
| A12 = | −7.0119E−01 | 9.3451E−02 | 1.2415E−01 | 1.3837E+00 |
| A14 = | | | −2.5011E−02 | −2.1495E+00 |
| A16 = | | | 2.0889E−03 | 1.1901E+00 |

The equation of the aspheric surface profiles of the eighth embodiment has the same form as that of the first embodiment. Moreover, the description of the factors in the relations is as those set forth in the first embodiment, but the values of the relations of the eighth embodiment are listed in the following TABLE 23.

TABLE 23

Embodment 8

| f [mm] | 2.13 | |f/f1| + |f/f2| + |f/f3| + |f/f4| | 1.27 |
|---|---|---|---|
| Fno | 2.20 | T12/(T23 + T34) | 1.65 |
| HFOV [deg.] | 38.5 | SL/TL | 0.74 |
| TL/ΣCT | 1.60 | R4/|R3| | −0.07 |
| f/f1 | 0.57 | |SAG32|/CT3 | 0.92 |
| f/|R3| | 0.02 | | |

Embodiment 9

Figure 9A:
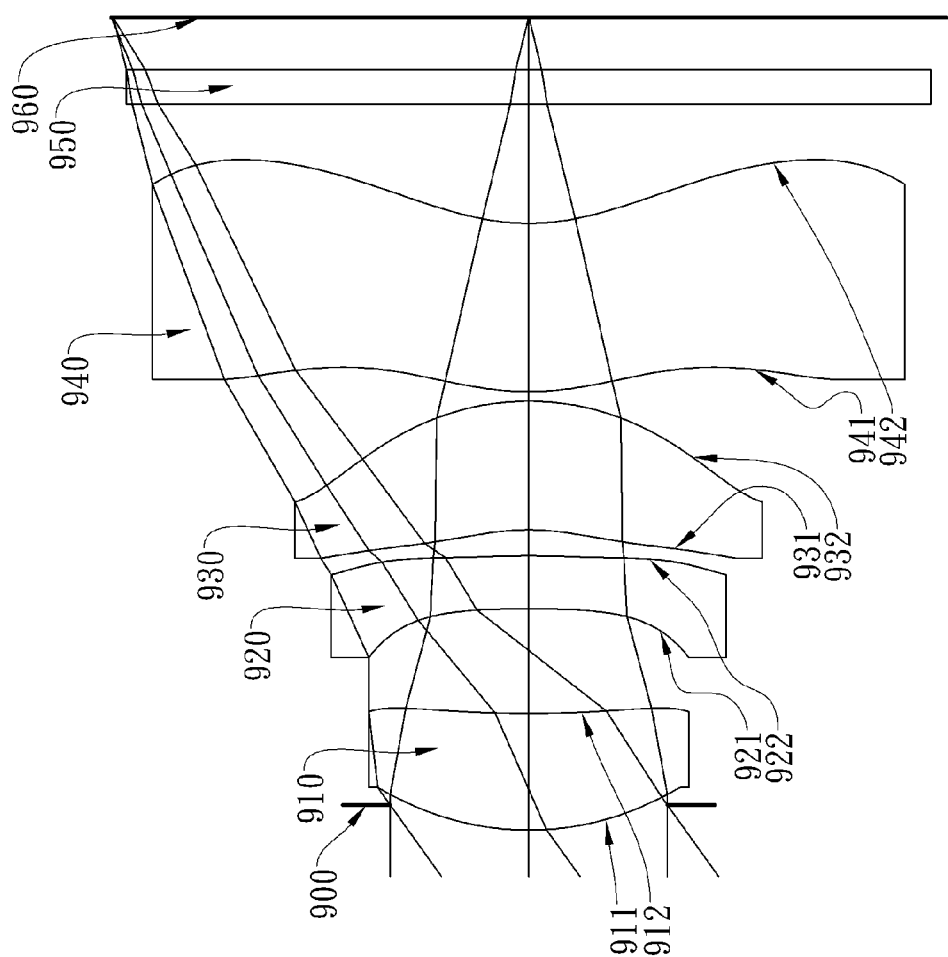
FIG. 9A shows an image capturing lens system in accordance with the ninth embodiment of the present disclosure.
Figure 9B:
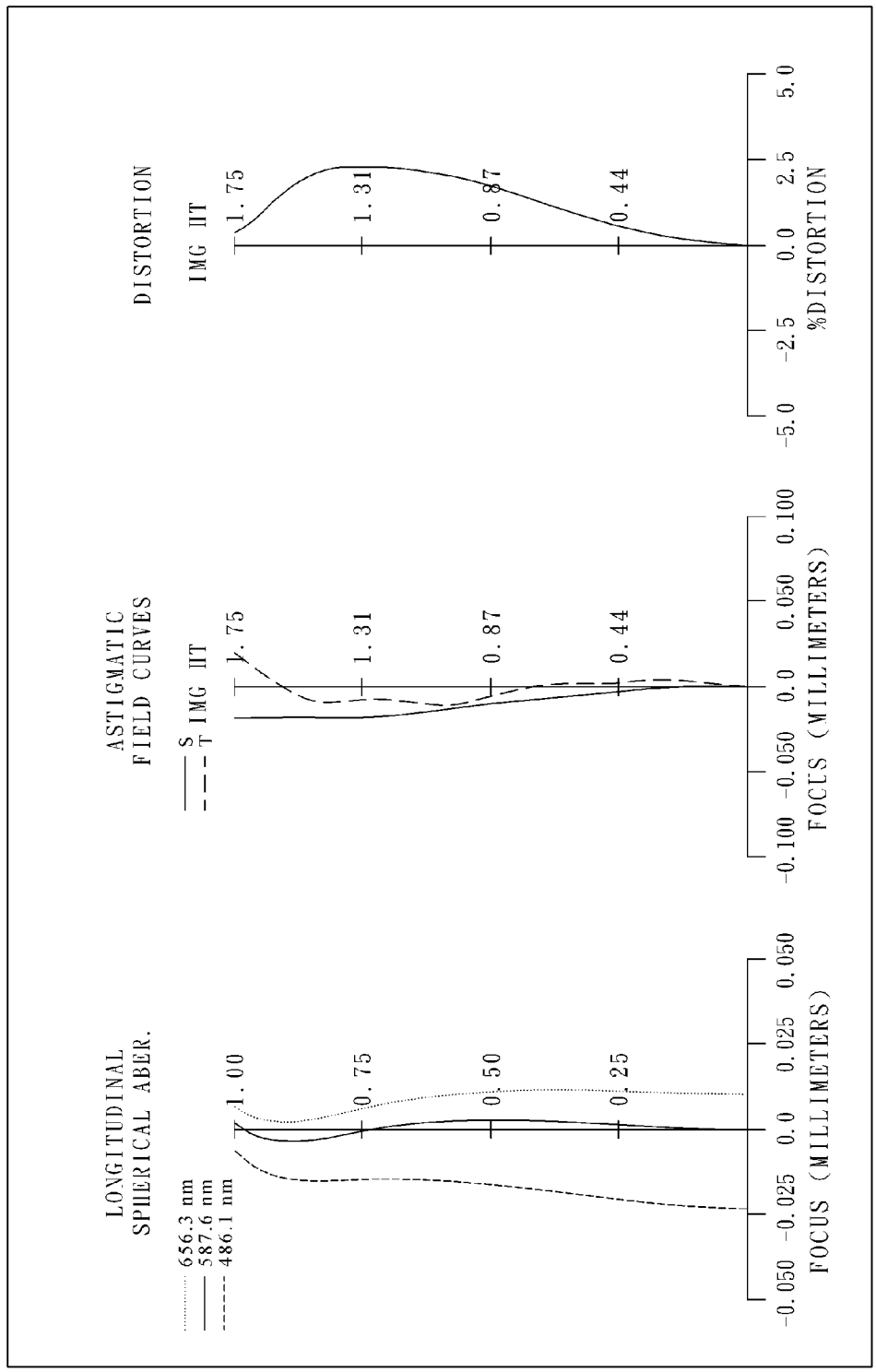
FIG. 9B shows the aberration curves of the ninth embodiment of the present disclosure.

FIG. 9A shows an image capturing lens system in accordance with the ninth embodiment of the present disclosure, FIG. 9B shows the aberration curves of the ninth embodiment of the present disclosure. The image capturing lens system of the ninth embodiment of the present disclosure mainly comprises four lens elements, in order from an object side to an image side:

a glass first lens element 910 with positive refractive power having a convex object-side surface 911 at the paraxial region, a concave image-side surface 912 at the paraxial region, and both of the object-side surface 911 and image-side surface 912 thereof being aspheric;

a plastic second lens element 920 with positive refractive power having a concave object-side surface 921 at the paraxial region, a convex image-side surface 922 at the paraxial region, and both of the object-side surface 921 and image-side surface 922 thereof being aspheric;

a plastic third lens element 930 with positive refractive power having a concave object-side surface 931 at the paraxial region, a convex image-side surface 932 at the paraxial region, and both of the object-side surface 931 and image-side surface 932 thereof being aspheric; and a plastic fourth lens element 940 with positive refractive power having a convex object-side surface 941 at the paraxial region, a concave at the paraxial region and convex at the peripheral region image-side surface 942 at the paraxial region, and both of the object-side surface 941 and image-side surface 942 thereof being aspheric;

wherein the image capturing lens system further comprises a stop 900 disposed between the object and the first lens element 910, the image capturing lens system further comprises a filter element 950 disposed between the fourth lens element 940 and the image plane 960, and the filter element 950 is made of glass and has no influence on the focal length of the image capturing lens system.

The detailed optical data of the ninth embodiment is shown in TABLE 24, the aspheric surface data is shown in TABLE 25, wherein the units of the curvature radius, the thickness and the focal length are mm, and HFOV is half of the maximal field of view.

TABLE 24

(Embodiment 9)
f = 2.44 mm, Fno = 2.10, HFOV = 35.6 deg.

| Surface # | | Curvature Radius | | Thickness | Material | Index | Focal Length |
|---|---|---|---|---|---|---|---|
| 0 | Object | Plano | | Infinity | | | |
| 1 | Ape. Stop. | Plano | | −0.105 | | | |
| 2 | Lens 1 | 1.188 | ASP | 0.489 | Glass | SUMITA KPG375 | 1.542 | 2.83 |
| 3 | | 4.516 | ASP | 0.440 | | | |
| 4 | Lens 2 | −4.513 | ASP | 0.221 | Plastic | MGC EP5000 | 1.634 | 59.23 |
| 5 | | −4.106 | ASP | 0.110 | | | |
| 6 | Lens 3 | −0.950 | ASP | 0.540 | Plastic | ZEONEX K26R | 1.535 | 32.35 |
| 7 | | −1.079 | ASP | 0.040 | | | |
| 8 | Lens 4 | 1.146 | ASP | 0.706 | Plastic | ZEONEX K26R | 1.535 | 48.56 |
| 9 | | 0.941 | ASP | 0.500 | | | |
| 10 | Filter | Plano | | 0.145 | Glass | HOYA BSC7 | 1.517 | — |
| 11 | | Plano | | 0.217 | | | |
| 12 | Image | Plano | | — | | | |

* The reference wavelength for the Focal length and refractive index calculations is d-line (587.6 nm).

TABLE 25

Aspheric Coefficients

| Surface # | 2 | 3 | 4 | 5 |
|---|---|---|---|---|
| k = | −2.0368E+00 | −3.0000E+01 | −1.4015E+02 | −3.0000E+01 |
| A4 = | 1.5120E−01 | −7.1369E−03 | −5.1455E−01 | 6.3608E−01 |
| A6 = | 1.6886E−02 | −1.6314E−01 | −3.7514E−01 | −1.9824E+00 |
| A8 = | −3.9302E−01 | −3.7279E−01 | −3.1255E+00 | 1.5546E+00 |
| A10 = | 1.5001E+00 | 9.5526E−01 | 9.3560E+00 | −1.4649E−02 |
| A12 = | −2.4127E+00 | −2.6331E+00 | −9.4640E+00 | −1.1237E−01 |

| Surface # | 6 | 7 | 8 | 9 |
|---|---|---|---|---|
| k = | −9.5185E+00 | −4.8560E−02 | −8.2485E+00 | −3.4669E+00 |
| A4 = | 6.5776E−01 | 3.6287E−02 | −1.0640E−01 | −1.3272E−01 |
| A6 = | −6.5275E−01 | −1.3268E−01 | −4.8350E−01 | −3.1436E−02 |
| A8 = | −1.5906E+00 | 3.3465E−01 | 9.5147E−01 | 1.1903E−01 |
| A10 = | 3.4097E+00 | −8.4730E−02 | −8.2222E−01 | −9.8991E−02 |
| A12 = | −1.7632E+00 | 6.7886E−02 | 3.8646E−01 | 4.1041E−02 |
| A14 = | | | −9.4181E−02 | −9.0401E−03 |
| A16 = | | | 9.2567E−03 | 8.5357E−04 |

The equation of the aspheric surface profiles of the ninth embodiment has the same form as that of the first embodiment. Moreover, the description of the factors in the relations is as those set forth in the first embodiment, but the values of the relations of the ninth embodiment are listed in the following TABLE 26.

TABLE 26

Embodiment 9

| f [mm] | 2.44 | |f/f1| + |f/f2| + |f/f3| + |f/f4| | 1.03 |
|---|---|---|---|
| Fno | 2.10 | T12/(T23 + T34) | 2.93 |
| HFOV [deg.] | 35.6 | SL/TL | 0.97 |
| TL/ΣCT | 1.74 | R4/|R3| | −0.91 |
| f/f1 | 0.86 | |SAG32|/CT3 | 0.78 |
| f/|R3| | 0.54 | | |

Embodiment 10

Figure 10A:
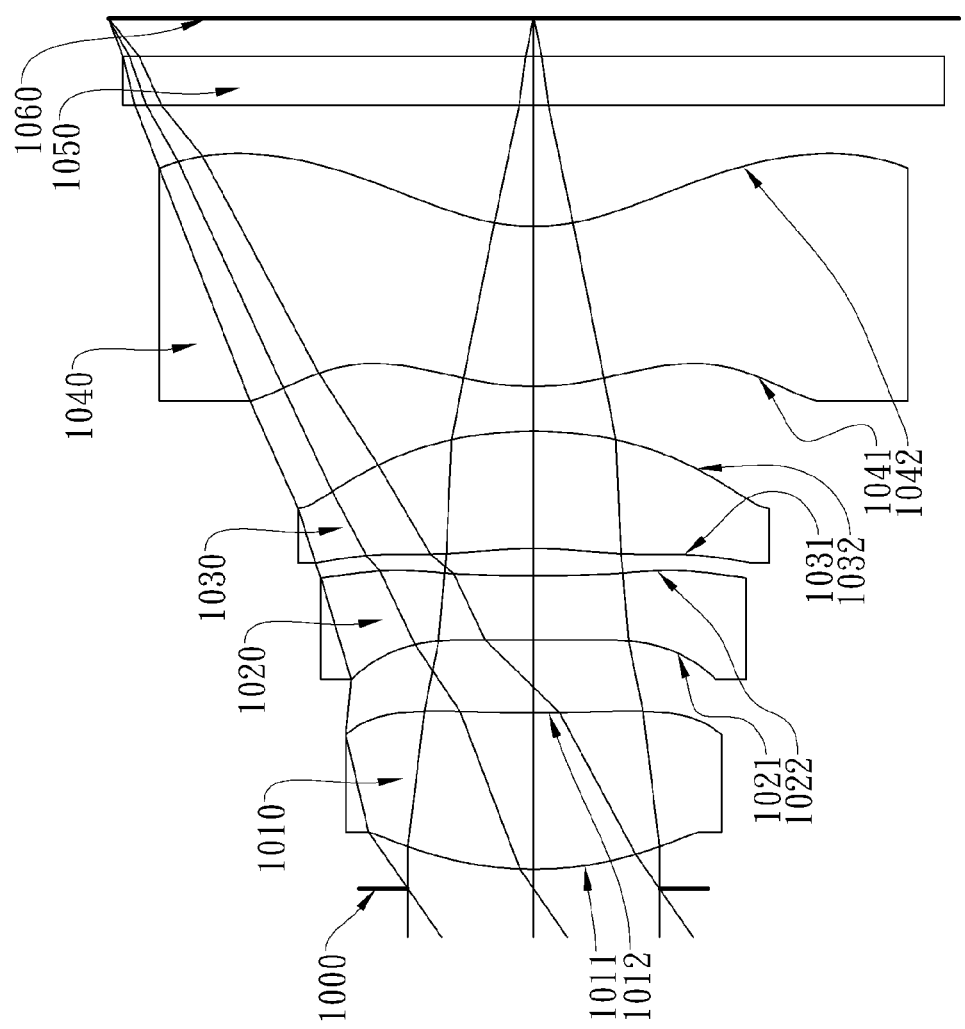
FIG. 10A shows an image capturing lens system in accordance with the tenth embodiment of the present disclosure.
Figure 10B:
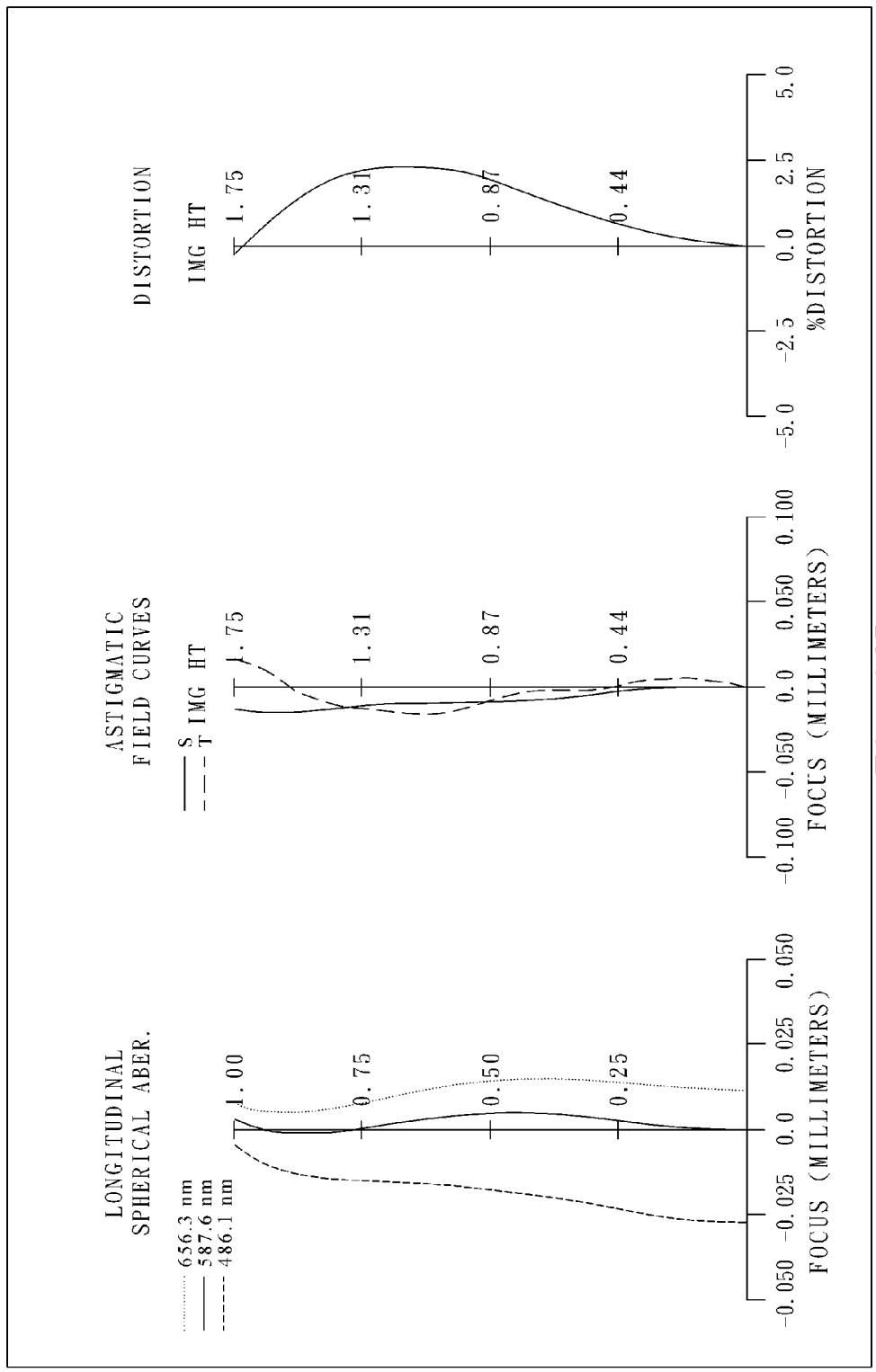
FIG. 10B shows the aberration curves of the tenth embodiment of the present disclosure.

FIG. 10A shows an image capturing lens system in accordance with the tenth embodiment of the present disclosure, FIG. 10B shows the aberration curves of the tenth embodiment of the present disclosure. The image capturing lens system of the tenth embodiment of the present disclosure mainly comprises four lens elements, in order from an object side to an image side:

a plastic first lens element 1010 with positive refractive power having a convex object-side surface 1011 at the paraxial region, a concave image-side surface 1012 at the paraxial region, and both of the object-side surface 1011 and image-side surface 1012 thereof being aspheric;

a plastic second lens element 1020 with positive refractive power having a convex object-side surface 1021 at the paraxial region, a concave image-side surface 1022 at the paraxial region, and both of the object-side surface 1021 and image-side surface 1022 thereof being aspheric;

a plastic third lens element 1030 with positive refractive power having a concave object-side surface 1031 at the paraxial region, a convex image-side surface 1032 at the paraxial region, and both of the object-side surface 1031 and image-side surface 1032 thereof being aspheric; and a plastic fourth lens element 1040 with positive refractive power having a convex object-side surface 1041 at the paraxial region, a concave at the paraxial region and convex at the peripheral region image-side surface 1042 at the paraxial region, and both of the object-side surface 1041 and image-side surface 1042 thereof being aspheric;

wherein the image capturing lens system further comprises a stop 1000 disposed between the object and the first lens element 1010, the image capturing lens system further comprises a filter element 1050 disposed between the fourth lens element 1040 and the image plane 1060, and the filter element 1050 is made of glass and has no influence on the focal length of the image capturing lens system.

The detailed optical data of the tenth embodiment is shown in TABLE 27, the aspheric surface data is shown in TABLE 28, wherein the units of the curvature radius, the thickness and the focal length are mm, and HFOV is half of the maximal field of view.

TABLE 27

(Embodiment 10)
f = 2.54 mm, Fno = 2.45, HFOV = 34.7 deg,

| Surface # | | Curvature Radius | | Thickness | Material | | Refractive Index | Focal Length |
|---|---|---|---|---|---|---|---|---|
| 0 | Object | Plano | | Infinity | | | | |
| 1 | Ape. Stop. | Plano | | 0.080 | | | | |
| 2 | Lens 1 | 1.419 | ASP | 0.644 | Plastic | ZEONEX K26R | 1.535 | 3.27 |
| 3 | | 6.361 | ASP | 0.299 | | | | |
| 4 | Lens 2 | 9.197 | ASP | 0.266 | Plastic | OKP4RX50 | 1.650 | 36.56 |
| 5 | | 14.836 | ASP | 0.112 | | | | |
| 6 | Lens 3 | −1.580 | ASP | 0.483 | Plastic | ZEONEX K26R | 1.535 | 81.09 |
| 7 | | −1.687 | ASP | 0.184 | | | | |
| 8 | Lens 4 | 1.036 | ASP | 0.659 | Plastic | ARTON-D4532 | 1.514 | 60.03 |
| 9 | | 0.841 | ASP | 0.500 | | | | |
| 10 | Filter | Plano | | 0.200 | Glass | HOYA BSC7 | 1.517 | — |
| 11 | | Plano | | 0.155 | | | | |
| 12 | Image | Plano | | — | | | | |

* The reference wavelength for the Focal length and refractive index calculations is d-line (587.6 nm).

TABLE 28

Aspheric Coefficients

| Surface # | 2 | 3 | 4 | 5 |
|---|---|---|---|---|
| k = | −2.9491E+00 | 5.5589E+01 | −4.9111E+00 | 3.0000E+00 |
| A4 = | 8.6782E−02 | −2.1564E−01 | −3.4683E−01 | 6.4198E−01 |
| A6 = | −1.8955E−03 | −2.7105E−01 | −7.9569E−01 | −2.3606E+00 |
| A8 = | −4.2659E−01 | 8.5842E−02 | −1.3229E+00 | 2.1028E+00 |
| A10 = | 1.0573E+00 | −1.2597E−01 | 7.2833E+00 | 3.9442E−01 |
| A12 = | −1.3503E+00 | −7.3225E−01 | −7.1161E+00 | −8.0771E−01 |
| A14 = | −3.7897E−01 | 3.8608E−01 | −8.6318E−01 | −5.3437E−02 |
| A16 = | −3.1123E−01 | −6.1485E−02 | 2.3147E+00 | −6.0398E−02 |

| Surface # | 6 | 7 | 8 | 9 |
|---|---|---|---|---|
| k = | −2.7975E+01 | 1.2299E−01 | −7.3635E+00 | −2.3281E+00 |
| A4 = | 7.7196E−01 | −8.4538E−02 | −1.0708E−01 | −2.3075E−01 |
| A6 = | −1.0473E+00 | −8.9482E−02 | −7.0581E−01 | 4.0379E−02 |
| A8 = | −1.3477E+00 | 3.5789E−01 | 1.0517E+00 | 8.9321E−02 |
| A10 = | 3.6483E+00 | −3.0691E−01 | −7.8437E−01 | −9.4375E−02 |
| A12 = | −2.1687E+00 | −1.3423E−03 | 3.7771E−01 | 4.2556E−02 |
| A14 = | −5.0169E−02 | 1.2551E−02 | −1.0154E−01 | −9.5906E−03 |
| A16 = | 2.4274E−01 | 1.3090E−01 | 1.0368E−02 | 8.8271E−04 |

The equation of the aspheric surface profiles of the tenth embodiment has the same form as that of the first embodiment. Moreover, the description of the factors in the relations is as those set forth in the first embodiment, but the values of the relations of the tenth embodiment are listed in the following TABLE 29.

TABLE 29

Embodment 10

| f [mm] | 2.54 | \|f/f1\| + \|f/f2\| + \|f/f3\| + \|f/f4\| | 0.92 |
|---|---|---|---|
| Fno | 2.45 | T12/(T23 + T34) | 1.01 |
| HFOV [deg.] | 34.7 | SL/TL | 1.02 |
| TL/ΣCT | 1.71 | R4/\|R3\| | 1.61 |
| f/f1 | 0.78 | \|SAG32\|/CT3 | 0.66 |
| f/\|R3\| | 0.28 | | |

Embodiment 11

Figure 11A:
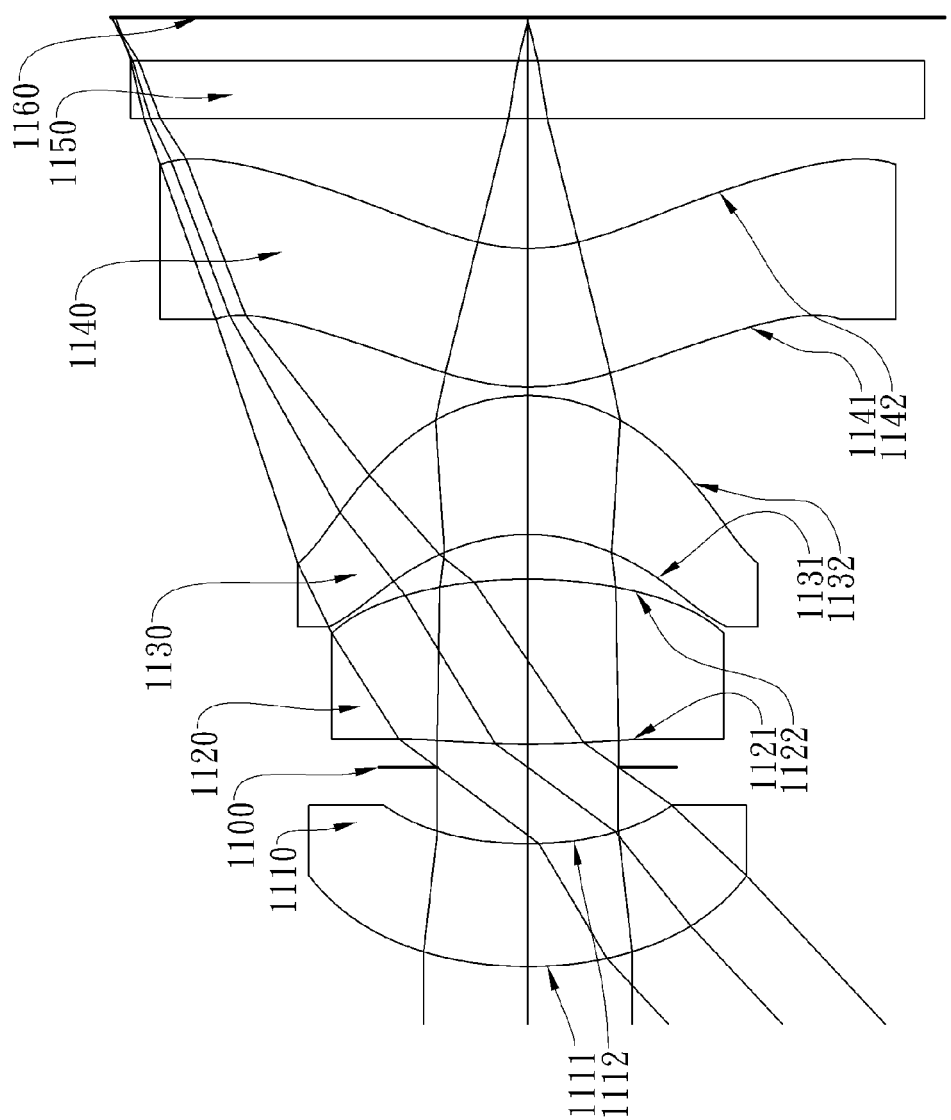
FIG. 11A shows an image capturing lens system in accordance with the eleventh embodiment of the present disclosure.
Figure 11B:
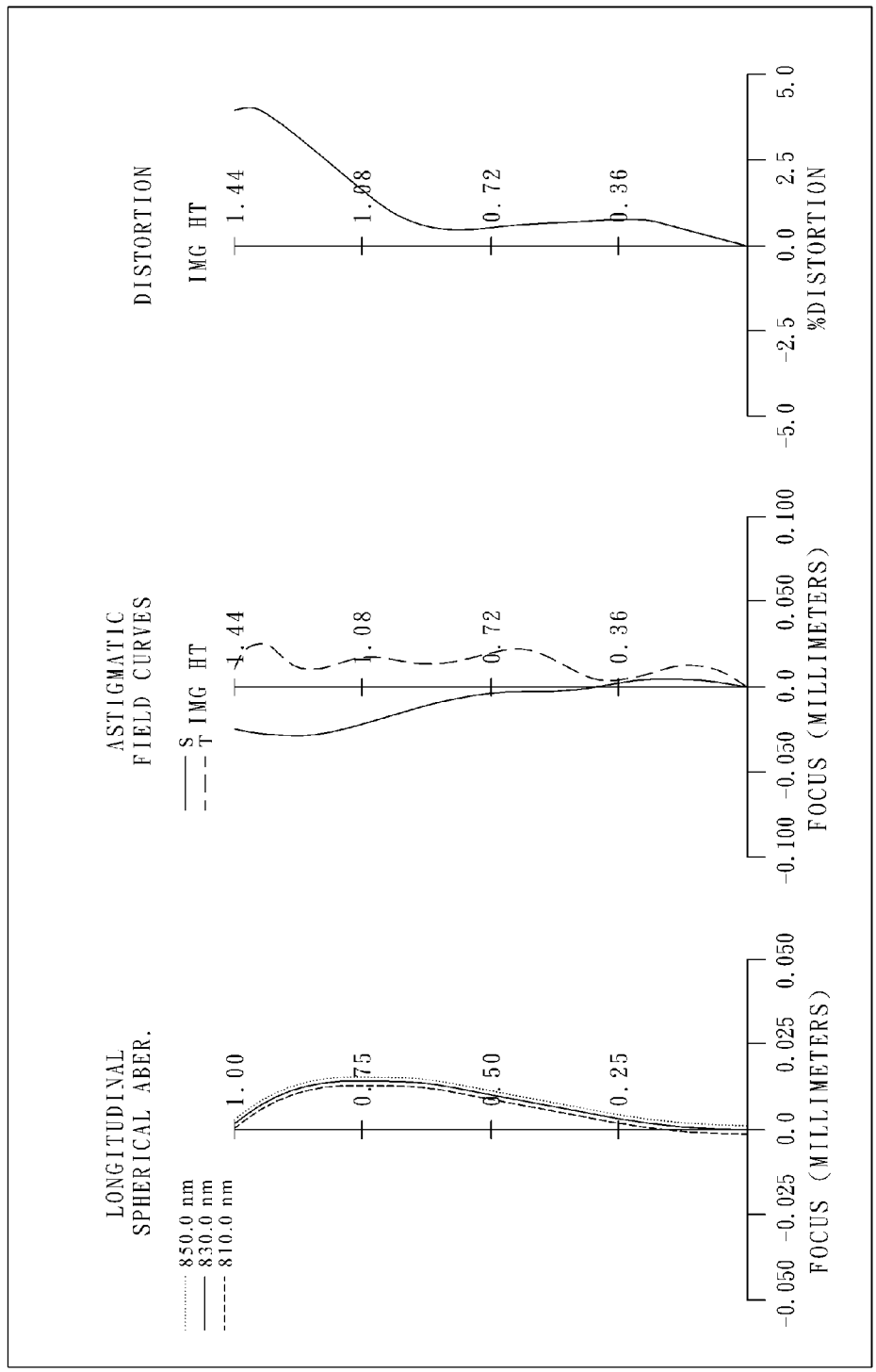
FIG. 11B shows the aberration curves of the eleventh embodiment of the present disclosure.

FIG. 11A shows an image capturing lens system in accordance with the eleventh embodiment of the present disclosure, FIG. 11B shows the aberration curves of the eleventh embodiment of the present disclosure. The image capturing lens system of the eleventh embodiment of the present disclosure mainly comprises four lens elements, in order from an object side to an image side:

a plastic first lens element 1110 with positive refractive power having a convex object-side surface 1111 at the paraxial region, a concave image-side surface 1112 at the paraxial region, and both of the object-side surface 1111 and image-side surface 1112 thereof being aspheric;

a plastic second lens element 1120 with positive refractive power having a convex object-side surface 1121 at the paraxial region, a convex image-side surface 1122 at the paraxial region, and both of the object-side surface 1121 and image-side surface 1122 thereof being aspheric;

a plastic third lens element 1130 with positive refractive power having a concave object-side surface 1131 at the paraxial region, a convex image-side surface 1132 at the paraxial region, and both of the object-side surface 1131 and image-side surface 1132 thereof being aspheric; and a plastic fourth lens element 1140 with positive refractive power having a convex object-side surface 1141 at the paraxial region, a concave at the paraxial region and convex at the peripheral region image-side surface 1142 at the paraxial region, and both of the object-side surface 1141 and image-side surface 1142 thereof being aspheric;

wherein the image capturing lens system further comprises a stop 1100 disposed between the first lens element 1110 and the second lens element 1120, the image capturing lens system further comprises a filter element 1150 disposed between the fourth lens element 1140 and the image plane 1160, and the filter element 1150 is made of glass and has no influence on the focal length of the image capturing lens system.

The detailed optical data of the eleventh embodiment is shown in TABLE 30, the aspheric surface data is shown in TABLE 31, wherein the units of the curvature radius, the thickness and the focal length are mm, and HFOV is half of the maximal field of view.

TABLE 30

(Embodiment 11)
f = 1.48 mm, Fno = 2.05, HFOV = 43.0 deg.

| Surface # | | Curvature Radius | | Thickness | Material | | Index | Focal Length |
|---|---|---|---|---|---|---|---|---|
| 0 | Object | Plano | | Infinity | | | | |
| 1 | Lens 1 | 1.379 | ASP | 0.426 | Plastic | MGC EP5000 | 1.616 | 49.34 |
| 2 | | 1.275 | ASP | 0.264 | | | | |
| 3 | Ape. Stop. | Plano | | 0.081 | | | | |
| 4 | Lens 2 | 3.274 | ASP | 0.571 | Plastic | ARTON-D4532 | 1.507 | 2.24 |
| 5 | | −1.631 | ASP | 0.155 | | | | |
| 6 | Lens 3 | −0.600 | ASP | 0.480 | Plastic | ZEONEX K26R | 1.528 | 5.64 |
| 7 | | −0.637 | ASP | 0.030 | | | | |
| 8 | Lens 4 | 0.736 | ASP | 0.480 | Plastic | MGC EP5000 | 1.616 | 6.82 |
| 9 | | 0.670 | ASP | 0.450 | | | | |
| 10 | Filter | Plano | | 0.200 | Glass | HOYA BSC7 | 1.510 | — |
| 11 | | Plano | | 0.149 | | | | |
| 12 | Image | Plano | | — | | | | |

* The reference wavelength for the Focal length and refractive index calculations is 830 nm.

TABLE 31

Aspheric Coefficients

| Surface # | 1 | 2 | 4 | 5 |
|---|---|---|---|---|
| k = | −2.8175E+00 | −7.3405E+00 | −1.0000E+00 | 1.9072E+00 |
| A4 = | 2.9440E−01 | 9.1778E−01 | −2.8267E−01 | 2.7332E−01 |
| A6 = | 5.2624E−02 | −1.0683E+00 | 1.4903E+00 | −1.8018E+00 |
| A8 = | 1.5661E−01 | 5.1830E+00 | −1.8145E+01 | 4.8808E+00 |
| A10 = | −8.2634E−02 | −9.7500E+00 | 8.3630E+01 | −7.4927E+00 |
| A12 = | 3.1994E−01 | 3.6424E+00 | −1.6675E+02 | 3.2882E+00 |

| Surface # | 6 | 7 | 8 | 9 |
|---|---|---|---|---|
| k = | −7.2566E+00 | −4.2852E−01 | −5.8834E+00 | −2.4599E+00 |
| A4 = | −1.4192E+00 | −2.1862E−01 | 2.9998E−01 | −4.4843E−01 |
| A6 = | 2.5032E+00 | 4.0082E−01 | −2.1346E+00 | 2.0428E−01 |
| A8 = | −7.9163E+00 | 7.5110E−01 | 5.4151E+00 | 5.2293E−01 |
| A10 = | 2.3346E+01 | −3.6589E+00 | −7.4614E+00 | −9.4715E−01 |
| A12 = | −2.0352E+01 | 6.2653E+00 | 5.7949E+00 | 6.7230E−01 |
| A14 = | | | −2.3904E+00 | −2.3104E−01 |
| A16 = | | | 3.9915E−01 | 3.1378E−02 |

The equation of the aspheric surface profiles of the eleventh embodiment has the same form as that of the first embodiment. Moreover, the description of the factors in the relations is as those set forth in the first embodiment, but the values of the relations of the eleventh embodiment are listed in the following TABLE 32.

TABLE 32

Embodment 11

| f [mm] | 1.48 | $|f/f1| + |f/f2| + |f/f3| + |f/f4|$ | 1.17 |
|---|---|---|---|
| Fno | 2.05 | T12/(T23 + T34) | 1.86 |
| HFOV [deg.] | 43.0 | SL/TL | 0.79 |
| TL/ΣCT | 1.68 | R4/|R3| | −0.50 |
| f/f1 | 0.03 | |SAG32|/CT3 | 1.21 |
| f/|R3| | 0.45 | | |

It is to be noted that TABLES 1-32 show different data of the different embodiments; however, the data of the different embodiments are obtained from experiments. Therefore, any image capturing lens system of the same structure is considered to be within the scope of the present disclosure even if it uses different data. The embodiments depicted above and the appended drawings are exemplary and are not intended to limit the scope of the present disclosure.

What is claimed is:

1. An image capturing lens system, in order from an object side to an image side comprising:
    a first lens element with positive refractive power having a convex object-side surface and a concave image-side surface;
    a second lens element with positive refractive power;
    a third lens element with positive refractive power; and
    a fourth lens element with positive refractive power having a convex object-side surface, a concave at a paraxial region and convex at a peripheral region image-side surface, and both of the object-side and image-side surfaces thereof being aspheric;
    wherein the lens elements of the image capturing lens system with refractive power are the first lens element, the second lens element, the third lens element and the fourth lens element, an axial distance between the object-side surface of the first lens element and an image plane is TL, a sum of central thicknesses of the first, the second, the third and the fourth lens elements is Z CT, a focal length of the image capturing lens system is f, a curvature radius of an object-side surface of the second lens element is R3, and they satisfy the following relations:

$1.35 < TL/\Sigma CT < 1.95$; and $0 < f/|R3| < 1.0$.

2. The image capturing lens system according to claim 1, wherein an axial distance between the first and the second lens elements is T12, an axial distance between the second and the third lens elements is T23, an axial distance between the third and the fourth lens elements is T34, and they satisfy the following relation:

$0.90 < T12/(T23+T34) < 3.0$.

3. The image capturing lens system according to claim 1, wherein the third lens element has a concave object-side surface and a convex image-side surface.

4. The image capturing lens system according to claim 3, wherein the second lens element has a convex image-side surface.

5. The image capturing lens system according to claim 4, wherein a f-number of the image capturing lens system is Fno, and it satisfies the following relation:

$1.4 < Fno < 2.8$.

6. The image capturing lens system according to claim 4, wherein the focal length of the image capturing lens system is f, the curvature radius of the object-side surface of the second lens element is R3, and they satisfy the following relation:

$$0 < f/|R3| < 0.6.$$

7. The image capturing lens system according to claim 4, wherein the focal length of the image capturing lens system is f, a focal length of the first lens element is f1, a focal length of the second lens element is f2, a focal length of the third lens element is f3, a focal length of the fourth lens element is f4, and they satisfy the following relation:

$$0.70 < |f/f1| + |f/f2| + |f/f3| + |f/f4| < 1.5.$$

8. The image capturing lens system according to claim 4, wherein the first, the second, the third and the fourth lens elements are made of plastic material, and the object-side and the image-side surfaces of the first, the second, the third and the fourth lens elements are aspheric.

9. The image capturing lens system according to claim 3, wherein the image capturing lens system further comprises a stop disposed between the first and the second lens element, an axial distance between the stop and the image plane is SL, the axial distance between the object-side surface of the first lens element and the image plane is TL, and they satisfy the following relation:

$$0.65 < SL/TL < 0.85.$$

10. The image capturing lens system according to claim 9, wherein a curvature radius of the image-side surface of the second lens element is R4, the curvature radius of the object-side surface of the second lens element is R3, and they satisfy the following relation:

$$-0.92 < R4/|R3| < 0.$$

11. The image capturing lens system according to claim 9, wherein a distance in parallel with the optical axis from an axial vertex to a maximal effective diameter position on the image-side surface of the third lens element is SAG32, the central thickness of the third lens element is CT3, and they satisfy the following relation:

$$1.0 < |SAG32|/CT3 < 2.0.$$

12. The image capturing lens system according to claim 9, wherein the image capturing lens system is used for infrared wavelengths ranging from 780 nm to 950 nm.

13. The image capturing lens system according to claim 9, wherein the focal length of the image capturing lens system is f, the focal length of the first lens element is f1, and they satisfy the following relation:

$$0.1 < f/f1 < 1.0.$$

14. An image capturing lens system, in order from an object side to an image side comprising:
a first lens element with positive refractive power having a convex object-side surface and a concave image-side surface;
a second lens element with positive refractive power having a convex image-side surface;
a third lens element with positive refractive power; and
a fourth lens element with positive refractive power having a convex object-side surface, a concave at a paraxial region and convex at a peripheral region image-side surface, and both of the object-side and image-side surfaces thereof being aspheric;
wherein the lens elements of the image capturing lens system with refractive power are the first lens element, the second lens element, the third lens element and the fourth lens element, an axial distance between the object-side surface of the first lens element and an image plane is TL, a sum of central thicknesses of the first, the second, the third and the fourth lens elements is ΣCT, a curvature radius of an object-side surface of the second lens element is R3, a curvature radius of the image-side surface of the second lens element is R4, and they satisfy the following relations:

$$1.35 < TL/\Sigma CT < 2.50; \text{ and}$$

$$-0.92 < R4/|R3| < 0.$$

15. The image capturing lens system according to claim 14, wherein the image capturing lens system further comprises a stop disposed between the first and the second lens element, an axial distance between the stop and the image plane is SL, the axial distance between the object-side surface of the first lens element and the image plane is TL, and they satisfy the following relation:

$$0.65 < SL/TL < 0.85.$$

16. The image capturing lens system according to claim 14, wherein the focal length of the image capturing lens system is f, the focal length of the i-th lens element is fi, such as the focal length of the first lens element is f1, the focal length of the second lens element is f2, the focal length of the third lens element is f3, the focal length of the fourth lens element is f4, and they satisfy the following relations:

$$|f/fi| < 0.70, i = 1, 2, 3, 4.$$

17. The image capturing lens system according to claim 14, wherein the curvature radius of the image-side surface of the second lens element is R4, the curvature radius of the object-side surface of the second lens element is R3, and they satisfy the following relation:

$$-0.65 < R4/|R3| < 0.$$

18. The image capturing lens system according to claim 14, wherein a focal length of the image capturing lens system is f, a focal length of the first lens element is f1, a focal length of the second lens element is f2, a focal length of the third lens element is f3, a focal length of the fourth lens element is f4, and they satisfy the following relation:

$$0.70 < |f/f1| + |f/f2| + |f/f3| + |f/f4| < 1.5.$$

19. The image capturing lens system according to claim 18, wherein the third lens element has a concave object-side surface and a convex image-side surface.

20. The image capturing lens system according to claim 19, wherein an axial distance between the first and the second lens elements is T12, an axial distance between the second and the third lens elements is T23, an axial distance between the third and the fourth lens elements is T34, and they satisfy the following relation:

$$0.90 < T12/(T23 + T34) < 3.0.$$

21. The image capturing lens system according to claim 19, wherein the axial distance between the object-side surface of the first lens element and the image plane is TL, the sum of central thicknesses of the first, the second, the third and the fourth lens elements is ΣCT, and they satisfy the following relation:

$$1.35 < TL/\Sigma CT < 1.95.$$

22. The image capturing lens system according to claim 19, wherein the image capturing lens system is used for infrared wavelengths ranging from 780 nm to 950 nm.

* * * * *

UNITED STATES PATENT AND TRADEMARK OFFICE
CERTIFICATE OF CORRECTION

PATENT NO. : 8,730,590 B1  
APPLICATION NO. : 13/743127  
DATED : May 20, 2014  
INVENTOR(S) : Tsung-Han Tsai et al.

Page 1 of 1

It is certified that error appears in the above-identified patent and that said Letters Patent is hereby corrected as shown below:

In the Claims

Column 30, Claim 1, Line 40: "second, the third and the fourth lens elements is ZCT, a" should read -- second, the third and the fourth lens elements is $\Sigma CT$, a --.

Signed and Sealed this  
Thirtieth Day of December, 2014

Michelle K. Lee  
*Deputy Director of the United States Patent and Trademark Office*